(12) United States Patent
Wooden et al.

(10) Patent No.: US 11,673,168 B2
(45) Date of Patent: Jun. 13, 2023

(54) ADJUSTABLE OUTLET FOR MOBILE BLOWER

(71) Applicant: Country Home Products, Inc., Vergennes, VT (US)

(72) Inventors: William D. Wooden, South Burlington, VT (US); Anthony Orgain, Shelburne, VT (US); Seth Joubert, Pascoag, RI (US)

(73) Assignee: Generac Power Systems, Inc., Waukesha, WI (US)

( * ) Notice: Subject to any disclaimer, the term of this patent is extended or adjusted under 35 U.S.C. 154(b) by 275 days.

(21) Appl. No.: 16/851,216

(22) Filed: Apr. 17, 2020

(65) Prior Publication Data

US 2020/0331037 A1 Oct. 22, 2020

Related U.S. Application Data

(60) Provisional application No. 62/836,498, filed on Apr. 19, 2019.

(51) Int. Cl.
*B08B 5/02* (2006.01)
*A01G 20/47* (2018.01)

(52) U.S. Cl.
CPC ............... *B08B 5/02* (2013.01); *A01G 20/47* (2018.02)

(58) Field of Classification Search
CPC .......... A01G 20/47; B08B 5/02; E01H 1/0809
See application file for complete search history.

(56) References Cited

U.S. PATENT DOCUMENTS

| | | | |
|---|---|---|---|
| 2,762,184 A | 9/1956 | Farrer |
| 2,887,714 A | 5/1959 | Hanson |
| 3,241,173 A | 3/1966 | Finn |
| 3,348,258 A | 10/1967 | Daneman |
| 3,539,271 A | 11/1970 | Greenwood |
| 3,721,025 A | 3/1973 | Orr |
| 3,776,459 A | 12/1973 | Bonvicini |
| 3,800,612 A | 4/1974 | Fulghum |

(Continued)

FOREIGN PATENT DOCUMENTS

| | | | | |
|---|---|---|---|---|
| CA | 2328225 A1 | * | 9/1999 | |
| CA | 2987275 A1 | * | 12/2016 | ............. A01G 20/47 |

(Continued)

OTHER PUBLICATIONS

Billy Goat, https://billygoat.com/na/en us/products/force-wheeled-blowers.html, Wheeled & Stand-On Blowers, 2022, 5 pages.

(Continued)

*Primary Examiner* — Marc Carlson
(74) *Attorney, Agent, or Firm* — Merchant & Gould P.C.

(57) ABSTRACT

A blower includes a motor mounted to a frame. The frame includes wheels mounted to the frame. The blower includes a fan powered by the motor and a blower outlet. The fan is configured to expel air from the fan through the blower outlet. The blower outlet is movable in a horizontal direction and a vertical direction. The blower includes a horizontal control for controlling a horizontal position of the blower outlet. The blower includes a vertical control for controlling a vertical position of the blower outlet. Both the horizontal and vertical controls are positioned remote from the blower outlet.

22 Claims, 20 Drawing Sheets

(56) References Cited

U.S. PATENT DOCUMENTS

| | | | |
|---|---|---|---|
| 3,903,679 A | 9/1975 | Sorenson et al. | |
| 3,968,938 A | 7/1976 | Ruhl et al. | |
| 4,016,709 A | 4/1977 | Hauser et al. | |
| 4,058,957 A | 11/1977 | Roseberry | |
| 4,118,826 A | 10/1978 | Kaeser | |
| 4,205,468 A | 6/1980 | Austin | |
| 4,324,552 A | 4/1982 | Boushek, Jr. et al. | |
| 4,557,710 A | 12/1985 | Greider | |
| 5,231,827 A | 8/1993 | Connolly et al. | |
| 5,276,940 A | 1/1994 | Renaudin | |
| 5,354,241 A | 10/1994 | Trefz et al. | |
| 5,542,241 A | 8/1996 | Lydy et al. | |
| 5,735,018 A * | 4/1998 | Gallagher | E01H 1/0809 15/328 |
| 5,797,251 A | 8/1998 | Busboom | |
| 6,073,305 A | 6/2000 | Hesskamp | |
| 6,226,833 B1 | 5/2001 | Kawaguchi et al. | |
| 6,253,416 B1 * | 7/2001 | Lauer | A01G 20/47 15/361 |
| 7,841,044 B1 | 11/2010 | Weihl et al. | |
| 8,056,180 B2 * | 11/2011 | Iacona | A47L 5/14 15/345 |
| 8,387,205 B2 * | 3/2013 | Weihl | A01D 42/06 15/347 |
| 2003/0082016 A1 * | 5/2003 | Eavenson, Sr. | A01G 20/47 406/38 |
| 2012/0234412 A1 * | 9/2012 | Prager | A01G 20/47 137/565.01 |
| 2015/0190021 A1 * | 7/2015 | Barkow | E01H 1/0809 15/405 |
| 2016/0113207 A1 * | 4/2016 | Shumaker | B08B 5/02 15/405 |
| 2016/0150922 A1 * | 6/2016 | Restall | A01G 20/47 29/428 |
| 2016/0152256 A1 * | 6/2016 | Restall | E01H 1/0809 137/899 |
| 2017/0112071 A1 * | 4/2017 | Shumaker | B60R 11/00 |
| 2018/0103810 A1 * | 4/2018 | Restall | A47L 5/14 |
| 2020/0120881 A1 * | 4/2020 | Hall | F04D 29/441 |
| 2020/0296893 A1 * | 9/2020 | Bohrer | A01G 20/47 |
| 2021/0114673 A1 * | 4/2021 | Street | E01H 1/0809 |

FOREIGN PATENT DOCUMENTS

| | | |
|---|---|---|
| CN | 202310616 U | 7/2012 |
| EP | 3220009 A1 | 9/2017 |

OTHER PUBLICATIONS

Schiller Grounds Care, Inc., Little Wonder® Optimax™ Blowers—Self-Propelled 38% More Air Movement. O Fatigue, 1999-2021, 7 pages.

Power Equipment Direct, https://www.leafblowersdirect.com/Power-King-PK1301-Leaf-Blower/p75333.html, PowerKing 14HP Kohler Command Self-Propelled Walk Behind Leaf Blower, 2022, 7 pages.

* cited by examiner

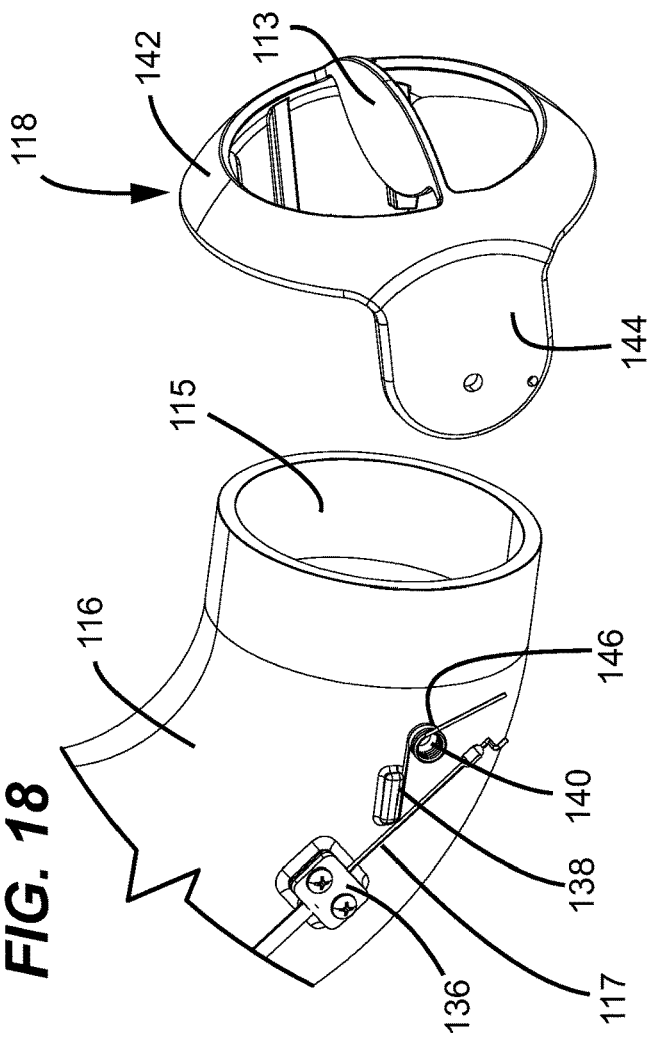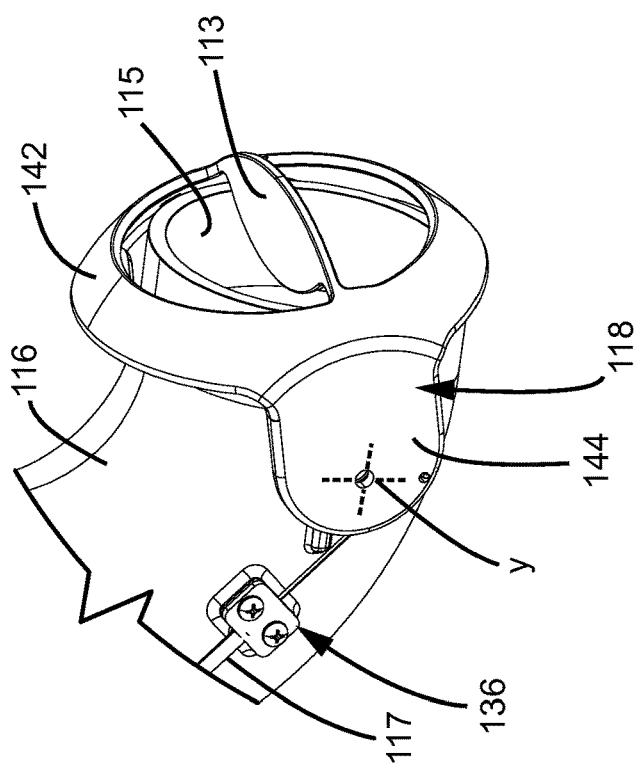

ADJUSTABLE OUTLET FOR MOBILE BLOWER

CROSS REFERENCE TO RELATED APPLICATIONS

This application claims priority to U.S. Provisional Application No. 62/836,498, filed on Apr. 19, 2019, entitled ADJUSTABLE OUTLET FOR MOBILE BLOWER, the disclosure of which is hereby incorporated by reference in its entirety.

BACKGROUND

Mobile blowers are often used to move leaves/debris on a surface such as lawns, fields, parking areas, and other areas. The blowers often utilize a fan to output a stream of air that is used by the operator to move the leaves/debris off the surface. The blowers require the operator to make multiple passes to direct the debris to various locations all while avoiding inadvertently blowing/moving unwanted debris (e.g., rocks against vehicles). Blowers often only have a fixed horizontal output for the stream of air. Even if the horizontal output of the stream of air is adjustable, blowers require the operator to stop the unit and throttle down before manually changing the position of the blower outlet. This results in a cumbersome activity that requires additional effort to complete the task.

Therefore, improvements in mobile blowers are needed.

SUMMARY

The present disclosure relates generally to mobile blowers. In one possible configuration, and by non-limiting example, a mobile blower includes a blower outlet that can be remotely controlled so as to move the blower outlet in a horizontal direction and a vertical direction is disclosed.

In one aspect of the present disclosure, a blower is disclosed. The blower includes a motor mounted to a frame. The frame includes wheels mounted to the frame. The blower includes a fan powered by the motor and a blower outlet. The fan is configured to expel air from the fan through the blower outlet. The blower outlet is movable in a horizontal direction and a vertical direction. The blower includes a horizontal control for controlling a horizontal position of the blower outlet. The blower includes a vertical control for controlling a vertical position of the blower outlet. Both the horizontal and vertical controls are positioned remote from the blower outlet.

In another aspect of the present disclosure, a blower is disclosed. The blower includes a motor mounted to a frame. The frame includes wheels mounted to the frame. The blower includes a fan powered by the motor. The blower includes a blower outlet. The fan is configured to expel air from the fan through the blower outlet. The blower outlet includes a horizontal flow element that is movably mounted to the frame. The blower outlet includes a vertical flow element that is movably attached to the horizontal flow element. The vertical flow element is movable with respect to the horizontal flow element. At least one of the horizontal and vertical flow elements are biased to a neutral position. The blower includes a control station attached to the frame. The control station includes a horizontal control for that controls movement of the horizontal flow element of the blower outlet and a vertical control that controls movement of the vertical flow element of the blower outlet.

In another aspect of the present disclosure, a blower is disclosed. The blower includes a motor mounted to a frame. The frame includes wheels mounted to the frame. The blower includes a fan powered by the motor. The blower includes a blower outlet configured to direct air from the fan. The blower includes a control station that is attached to the frame. The control station includes a first control for controlling movement of the blower outlet in a first direction. The control station includes a second control for controlling movement of the blower outlet in a second direction. The control station includes at least one of a motor control that is configured to control the motor and a self-propel control that is configured to control a driving speed of the wheels.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 17 is a perspective view of a portion of the blower outlet of the blower of FIG. 1.

FIG. 18 is an exploded view of a portion of the blower outlet of the blower of FIG. 1.

DETAILED DESCRIPTION

Figure 1:
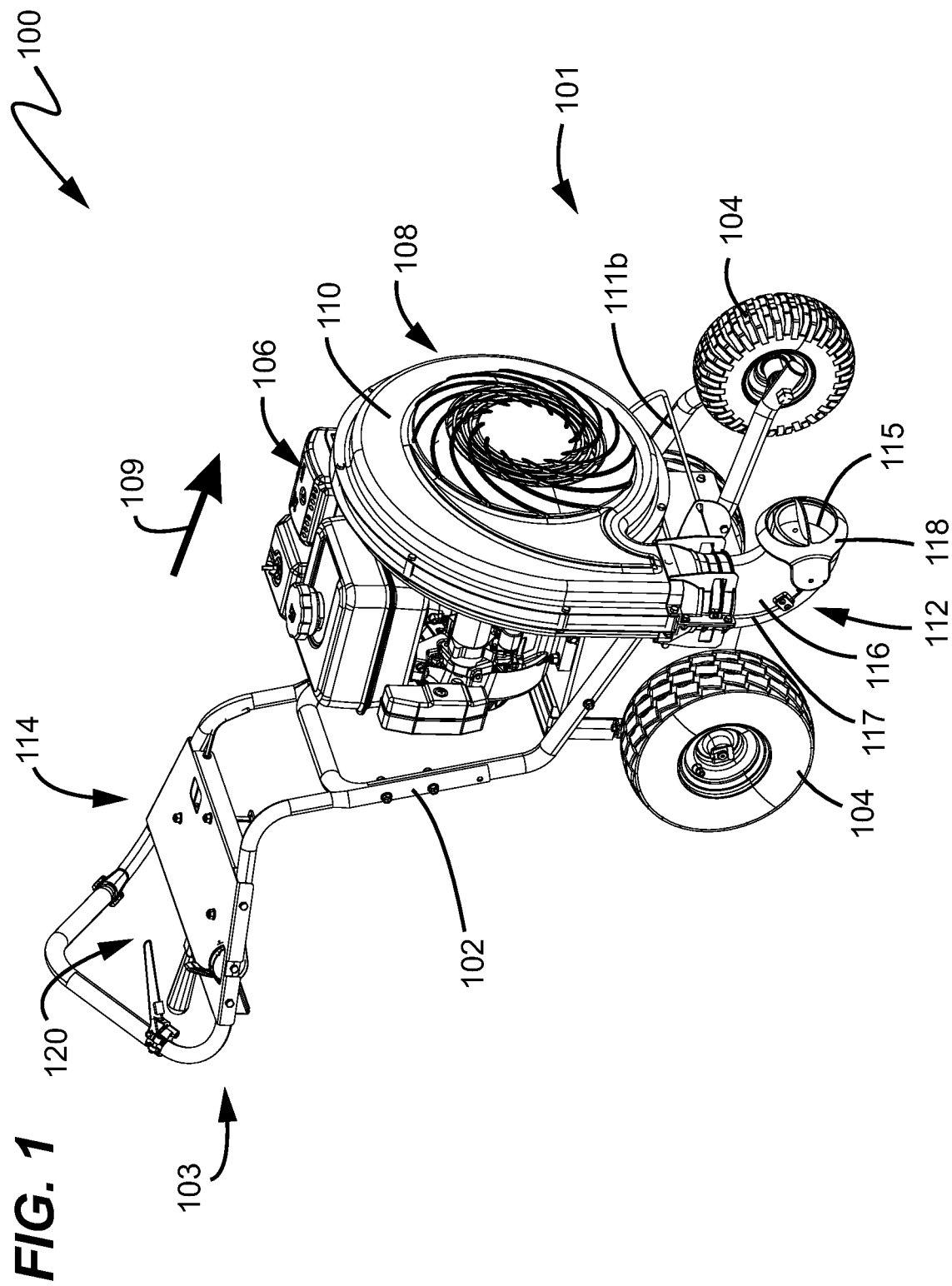
FIG. 1 is a perspective view of a blower, according to one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A blower 100 is shown in FIG. 1. The blower 100 includes a frame 102 including wheels 104, a motor 106 mounted to the frame 102, a fan 108 rotatably positioned within a housing 110, a blower outlet 112, and a control station 114.

The blower 100 has a front 101 and a rear 103. In some examples, during operation of the blower 100, an operator is generally positioned adjacent the control station 114 at the rear 103, and the blower 100 travels in a travel direction 109, shown with an arrow. In some examples, the blower 100 is self-propelled. In some examples, the operator walks behind the blower 100 during operation. In some examples, the blower 100 can carry the operator. For example, the blower 100 can include a seat. In other examples, the blower 100 can include a platform for the operator to stand on during operation.

The frame 102 supports the components of the blower 100 on the wheels 104. As depicted, the frame 102 includes a plurality of wheels 104. In some examples, the frame 102 includes three wheels 104. In other examples, the frame 102 can include tracks instead of wheels.

The motor 106 powers the rotation of the fan 108. In some examples, the motor 106 can also at least power the rotation of the wheels 104 so as to provide the blower 100 with a self-propel feature. In some examples, the motor 106 is an internal combustion engine. In other examples, the motor 106 is an electric motor. In other examples still, the motor 106 is a hybrid electric motor.

The fan 108 is configured to be rotated by the motor 106 to output a stream of air at the blower outlet 112. In some examples, the fan 108 is configured to be rotated by the motor 106 within the housing 110. The housing 110 is mounted to the frame 102. In some examples, the fan 108 can be connected to the blower 100 via a clutch to selectively connect the fan 108 to the motor 106. The fan 108 can include a plurality of blades that are configured to rotate around a single axis. In some examples, the fan 108 is connected to the motor 106 via a belt, chain, or the like. In other examples, the fan 108 is directly connected to an output shaft of the motor 106. In other examples, a rotational direction of the fan 108 is reversible.

The blower outlet 112 is configured to receive air blown by the fan 108 and output the blown air as a stream of air for use. The blower outlet 112 is remotely controlled so that the blower outlet 112 can be moved in at least a horizontal direction and a vertical direction. In some examples, the position of the blower outlet 112 can be controlled at the control station 114 while the blower 100 is in operation. Such control not only allows the operator more control over debris, but also allows the operator to more efficiently perform a task that was once cumbersome and time consuming. The blower outlet 112 includes a horizontal flow element 116 and a vertical flow element 118.

The horizontal flow element 116 can be moved in a horizontal direction and is movably attached to the housing 110 of the fan 108. In some examples, the horizontal flow element 116 is connected to the blower 100, specifically the frame 102, via the housing 110 and an outlet housing 107. In some examples, the horizontal flow element 116 is moved by an electronic or mechanical actuation mechanism. In some examples, the horizontal flow element 116 is connected to, and moved by, a pair of cables 111*a*, 111*b* that act as actuation mechanisms and travel to the control station 114 for manipulation. In some examples, the movement of the horizontal flow element 116 can be controlled by a single cable. In some examples, the movement of the horizontal flow element 116 is controlled by a single cable and a spring.

In the depicted example, the horizontal flow element 116 is generally a curved tube with an opening 115. In some examples, the horizontal flow element 116 has a bend so as to direct an air stream horizontally. In some examples, the bend is about 90 degrees. Such a configuration allows for the easy passage of air within the horizontal flow element 116. However, the horizontal flow element 116 can be configured in a variety of ways and not depart from the present disclosure.

The vertical flow element 118 is movably connected to the horizontal flow element 116. In some examples, the vertical flow element 118 is moved by an electronic or mechanical actuation mechanism. In some examples, the vertical flow element 118 is connected to, and moved by, a cable 117 that acts as an actuation mechanism and travels to the control station 114 for manipulation. In some examples, the movement of the vertical flow element 118 can be controlled by a of pair cables. In some examples, the vertical flow element 118 is pivotally connected to the horizontal flow element 116.

The vertical flow element 118 controls the vertical trajectory of the air leaving the opening 115 of the horizontal flow element. In some examples, the vertical flow element 118 has a louvered design with a single or plurality of louvers 113. In some examples, the vertical flow element 118 has a tube-like design. The vertical flow element 118 can be configured in a variety of ways and not depart from the present disclosure.

In some examples, the vertical and horizontal directions of the blower outlet 112 can be control by a single flow element, such as by a movable guide connected to the housing 110 forming a ball joint.

The control station 114 allows the operator to control the operation of the blower 100. In some examples, the control station 114 includes a plurality of controls 120 to control at least one of a motor operation, a self-propel speed, a horizontal position of the blower outlet, and a vertical output position of the blower outlet 112.

Figure 2:
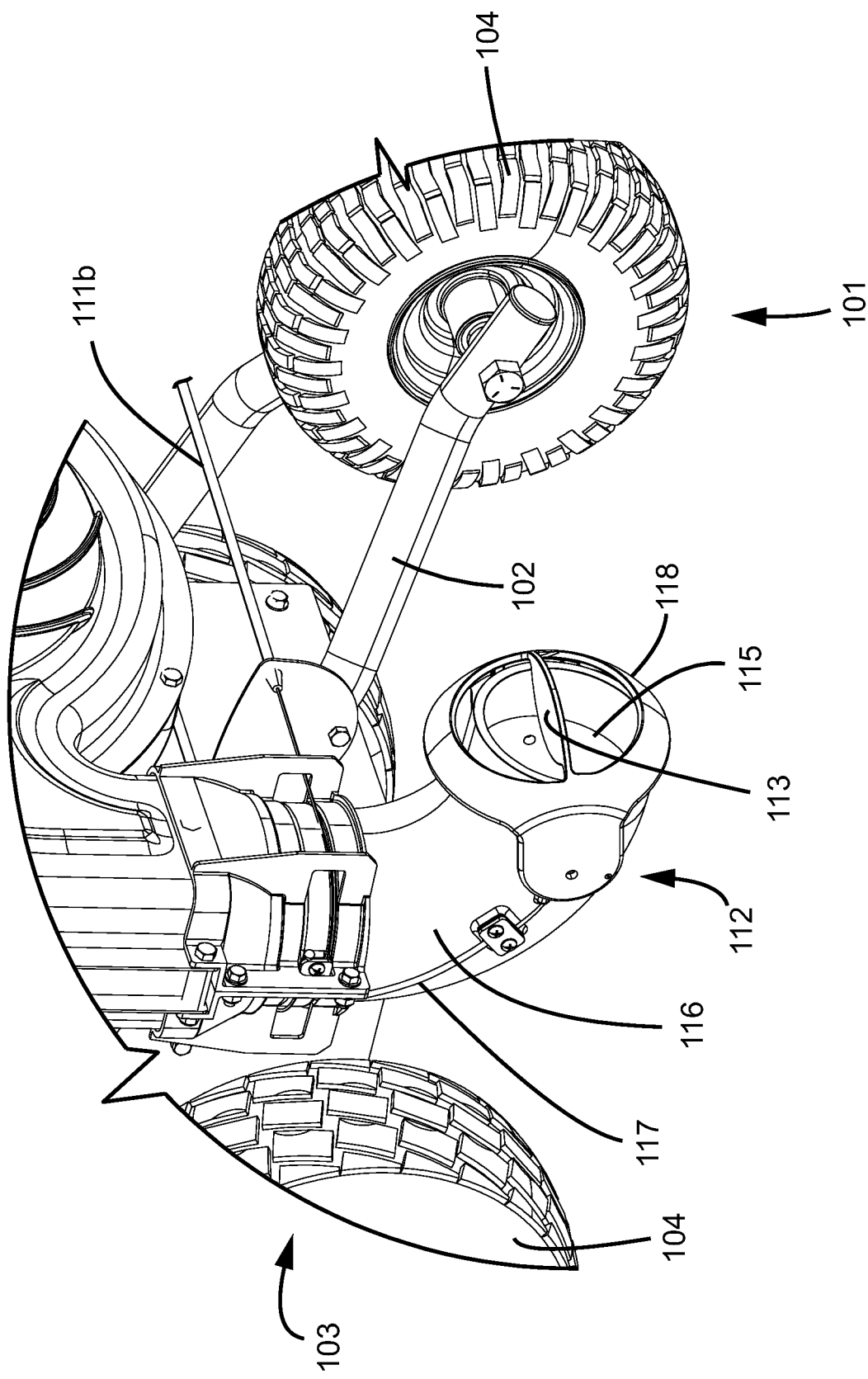
FIG. 2 is a zoomed-in side view of the blower of FIG. 1 with a horizontal flow element of a blower outlet in a forward facing position.
Figure 3:
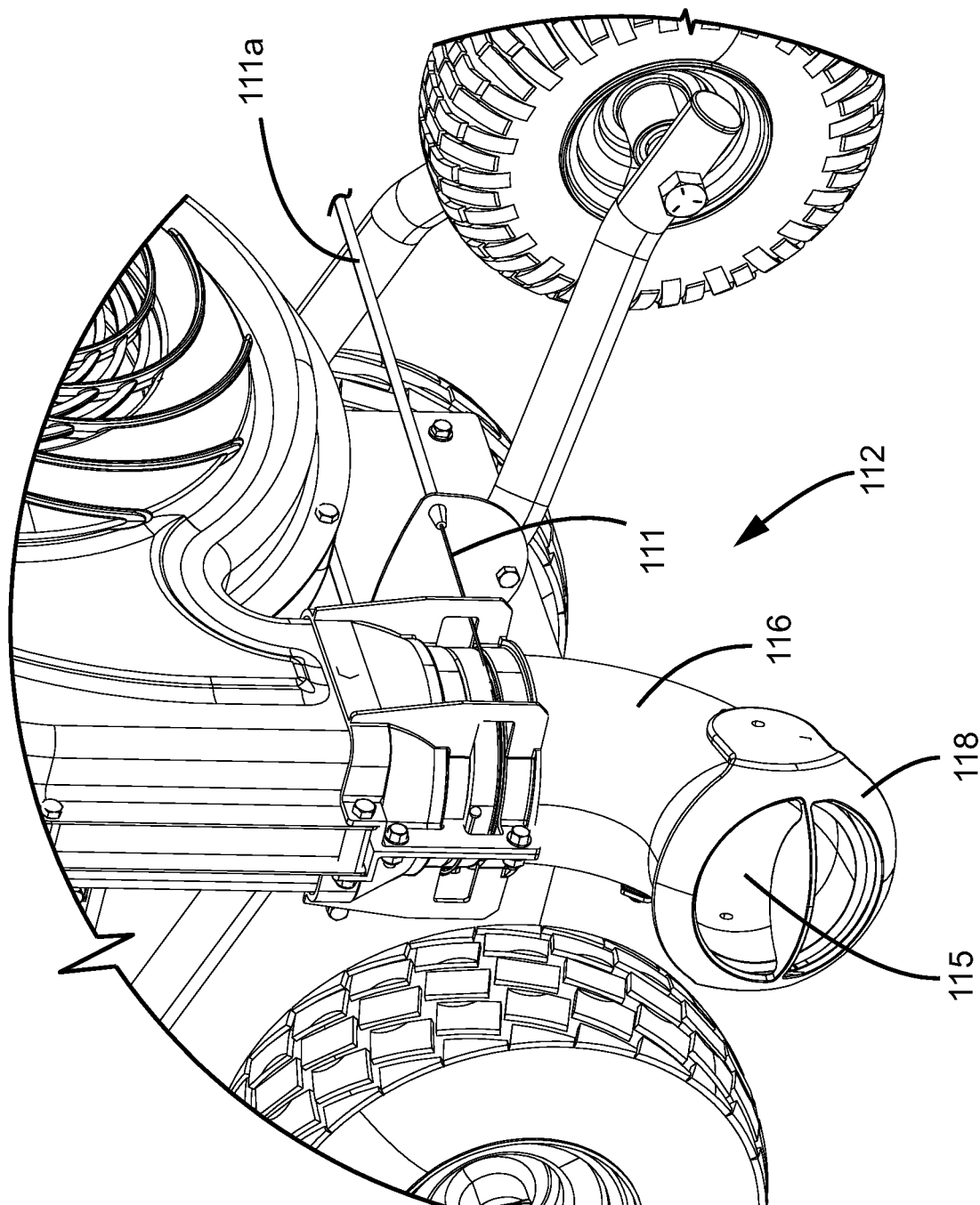
FIG. 3 is another zoomed-in side view of the blower of FIG. 1 with the horizontal flow element of the blower outlet in a side facing position.

FIG. 2 shows a zoomed-in view of the blower outlet 112 on the blower 100. As shown, the horizontal flow element 116 is positioned in a forward position so that the opening 115 is facing toward the front end 101 of the blower 100. FIG. 3 shows the horizontal flow element 116 positioned in a side facing position so that the opening 115 is facing away from the front end 101 and to a side of the blower 100. The horizontal flow element 116 can be configured to rotate to a variety of different positions. In some examples, the horizontal flow element 116 has a plurality of side facing positions.

The horizontal flow element 116 can be adjusted remotely so that the operator can adjust the horizontal position of the horizontal flow element 116 at any time, including while the blower 100 is being operated. In some examples, the horizontal flow element 116 can have a plurality of preset positions. In other examples, the horizontal flow element 116 can be infinitely adjusted by the operator. In some examples, the horizontal flow element 116 is biased to a neutral position. In some examples, the horizontal flow element 116 is biased to a neutral, forward position so that air is output toward the front end 101 of the blower 100.

Figure 4:
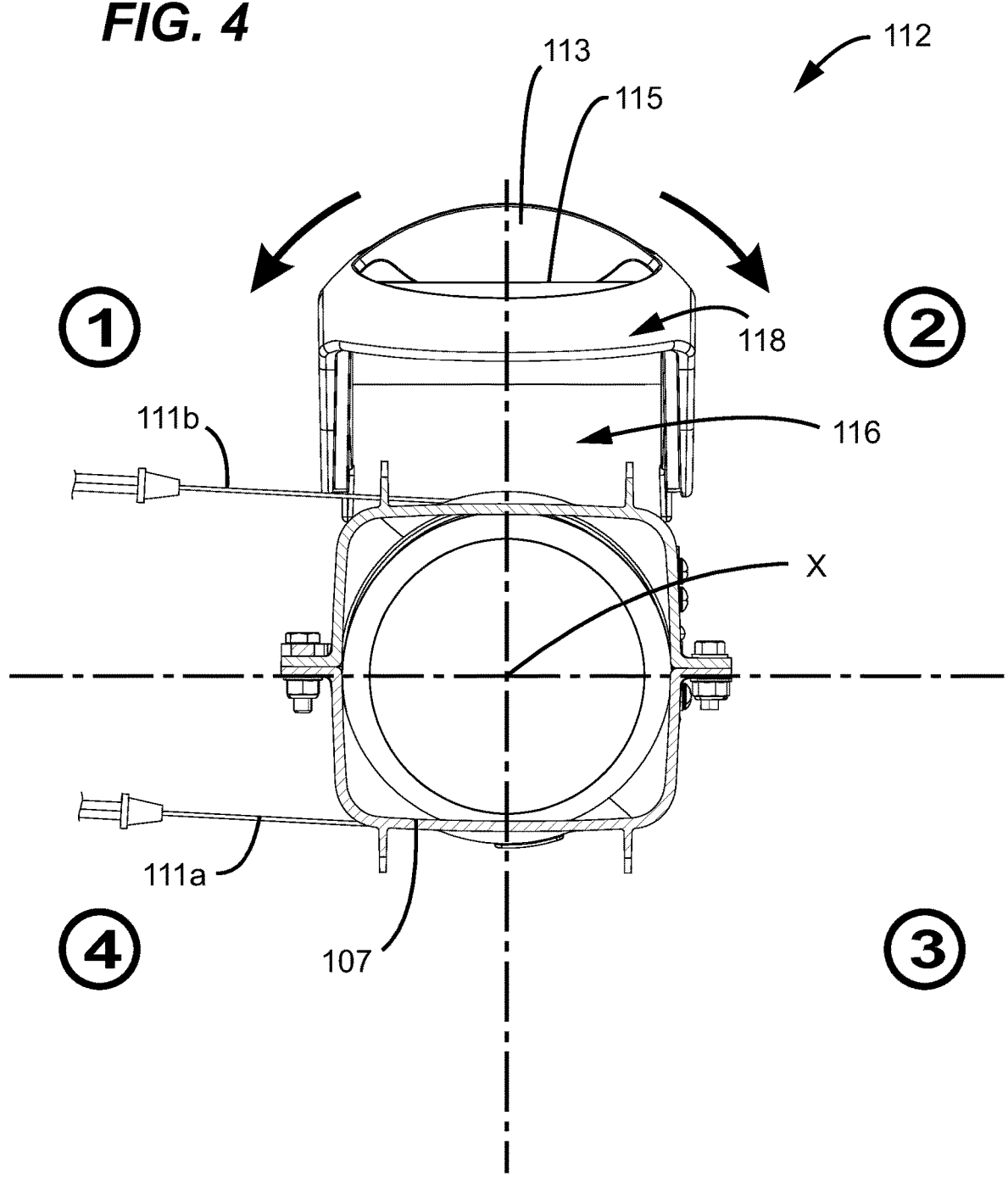
FIG. 4 is a top schematic view of the blower outlet of the blower of FIG. 1 in a forward position.

FIG. 4 shows a top schematic view of the blower outlet 112 with the horizontal flow element 116 in a forward position.

Figure 5:
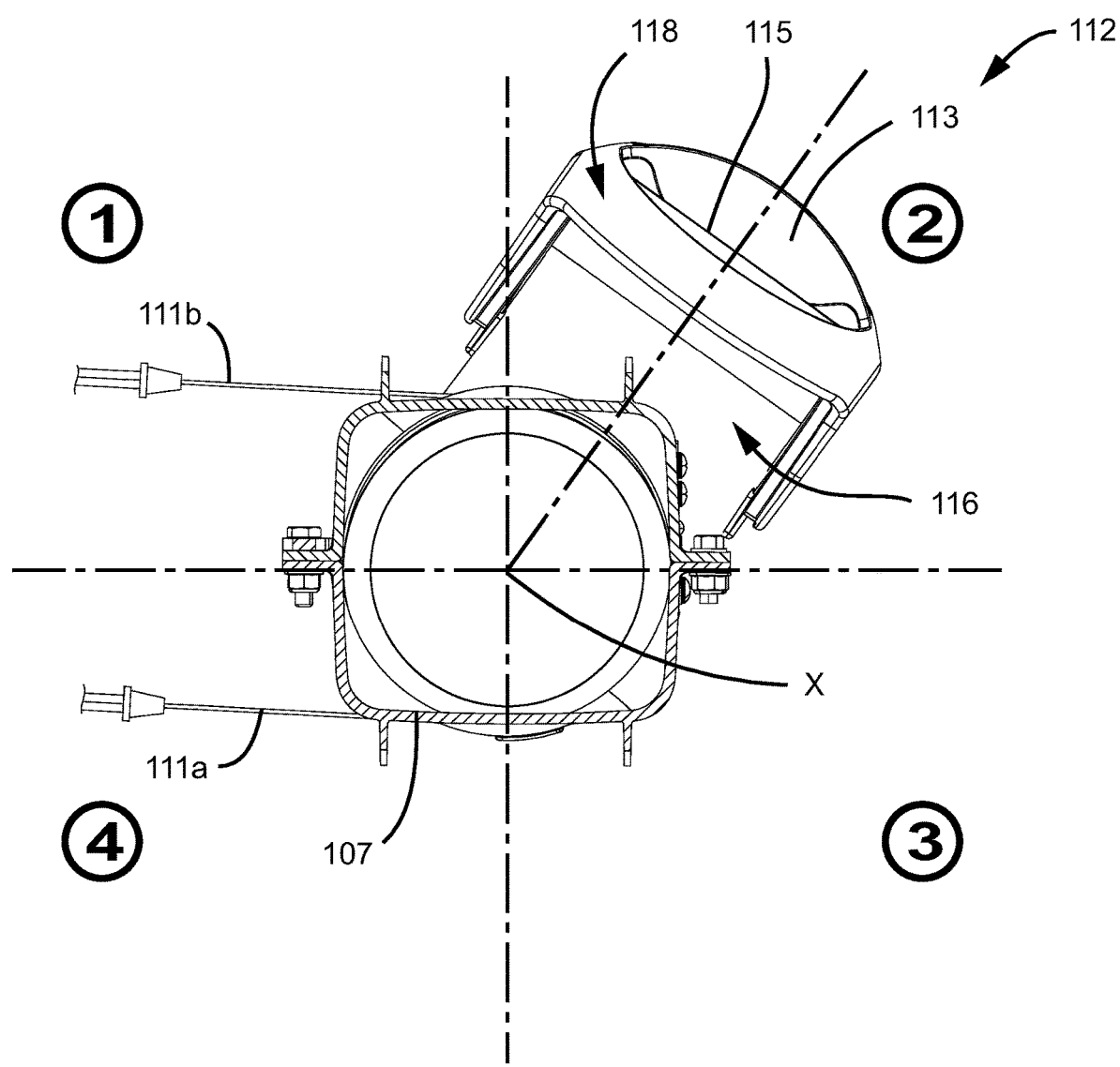
FIG. 5 is a top schematic view of the blower outlet of the blower of FIG. 1 in a forward right position.

FIG. 5 shows a top schematic view of the blower outlet 112 with the horizontal flow element 116 in a forward right position.

Figure 6:
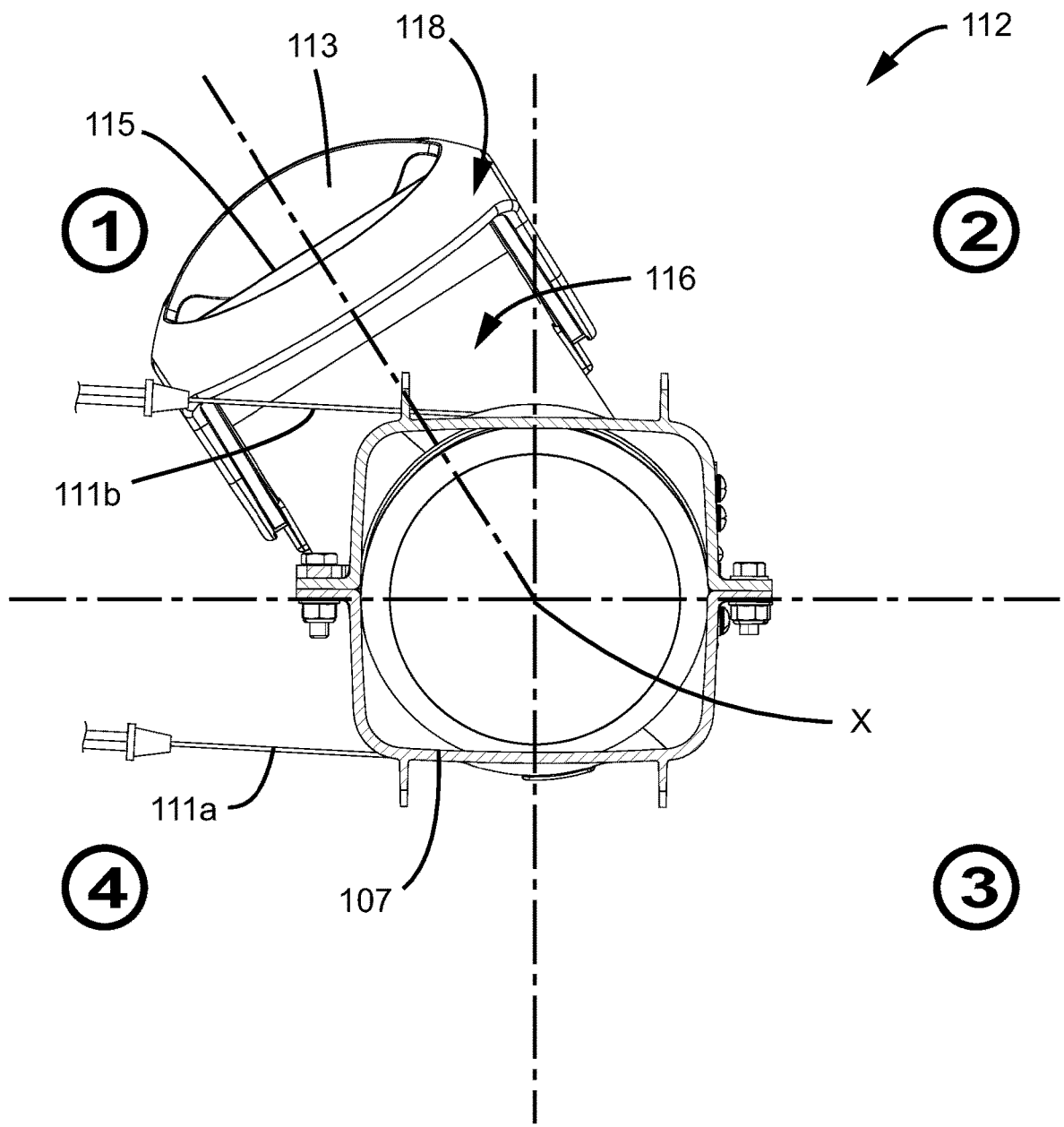
FIG. 6 is a top schematic view of the blower outlet of the blower of FIG. 1 in a forward left position.

FIG. 6 shows a top schematic view of the blower outlet 112 with the horizontal flow element 116 in a forward left position.

Figure 7:
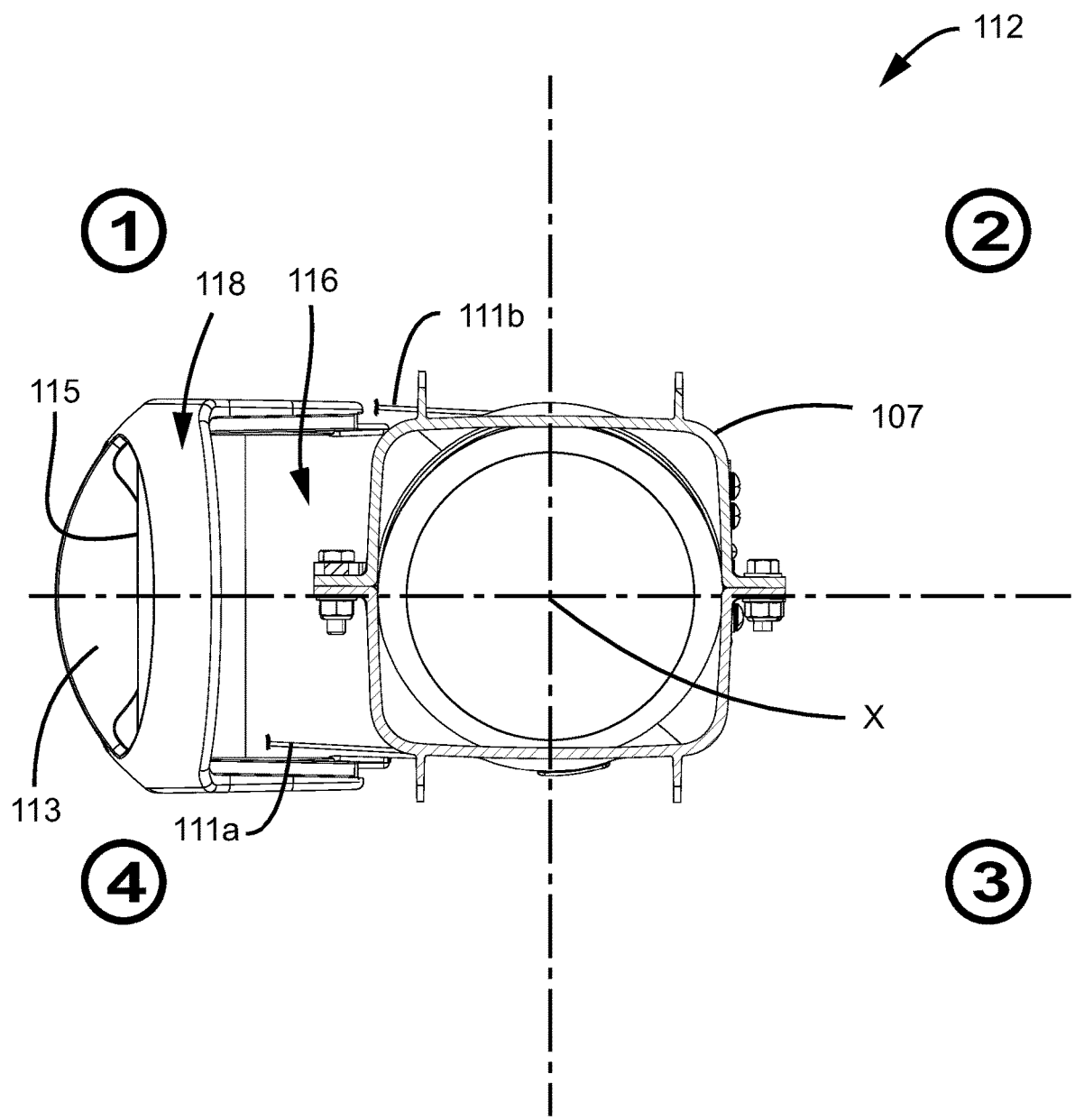
FIG. 7 is a top schematic view of the blower outlet of the blower of FIG. 1 in a left position.

FIG. 7 shows a top schematic view of the blower outlet 112 with the horizontal flow element 116 in a left position.

Figure 8:
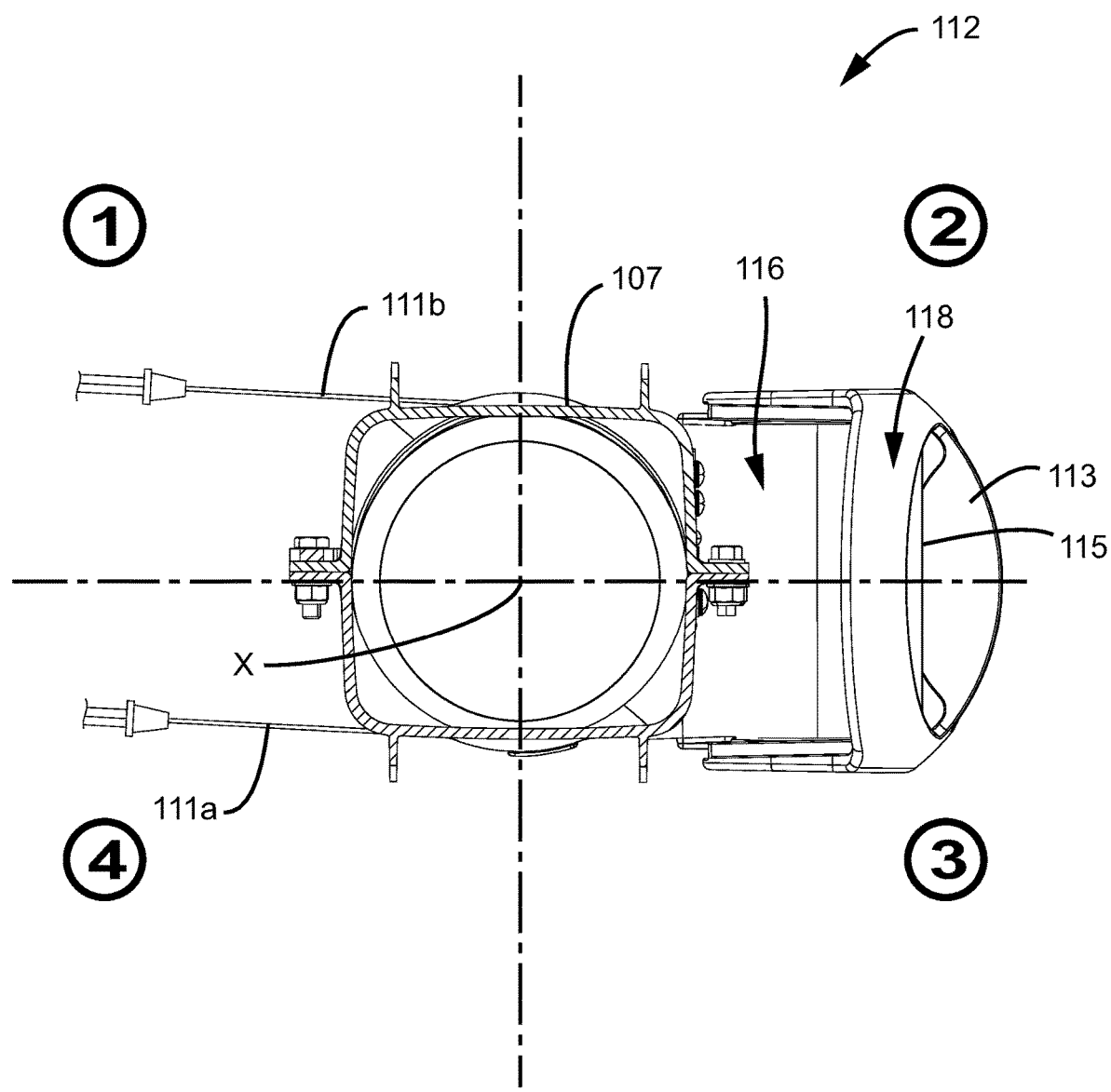
FIG. 8 is a top schematic view of the blower outlet of the blower of FIG. 1 in a right position.

FIG. 8 shows a top schematic view of the blower outlet 112 with the horizontal flow element 116 in a right position.

The horizontal flow element 116 of the blower outlet 112 can be rotated (indicated by arrows in FIG. 4) in a horizontal plane generally parallel to the ground and around a horizontal flow element axis X. In some examples, the horizontal flow element 116 can be rotated so that the opening 115 has about 90 degrees of horizontal rotational freedom. In some examples, the horizontal flow element 116 can be rotated so that the opening 115 has about 180 degrees of horizontal rotational freedom. In some examples, the horizontal flow element 116 can be rotated so that the opening 115 has about 270 degrees of horizontal rotational freedom. In some examples, the horizontal flow element 116 can be rotated so that the opening 115 has about 360 degrees of horizontal rotational freedom.

A first quadrant, a second quadrant, a third quadrant, and a fourth quadrant are shown schematically. In some examples, during operation of the blower 100, the opening 115 will be operated mostly in the first and second quadrants between the left position, shown in FIG. 7, and the right position, shown in FIG. 8. Such a range of rotation allows the opening 115 to be orientated to either side of the blower 100. This allows the operator complete control over the blower outlet 112, thereby allowing the operator to operate the blower 100 without having to make cumbersome maneuvers to direct the debris to be blown to various locations. For example, a operator can first make a pass with the blower outlet 112 facing in the right direction and then the operator can move the blower outlet 112 and make a pass with the blower outlet 112 in the left direction.

In some examples, the blower 100 can be configured to allow the operator to selectively rotate the opening 115 into the third and fourth quadrants. For example, the opening 115 can be rotated into the third and fourth quadrants only when the operator wants to control the air stream from contacting the environment, such as when near rocks or other objects that the operator does not want the air stream to blow on/toward.

Figure 9:
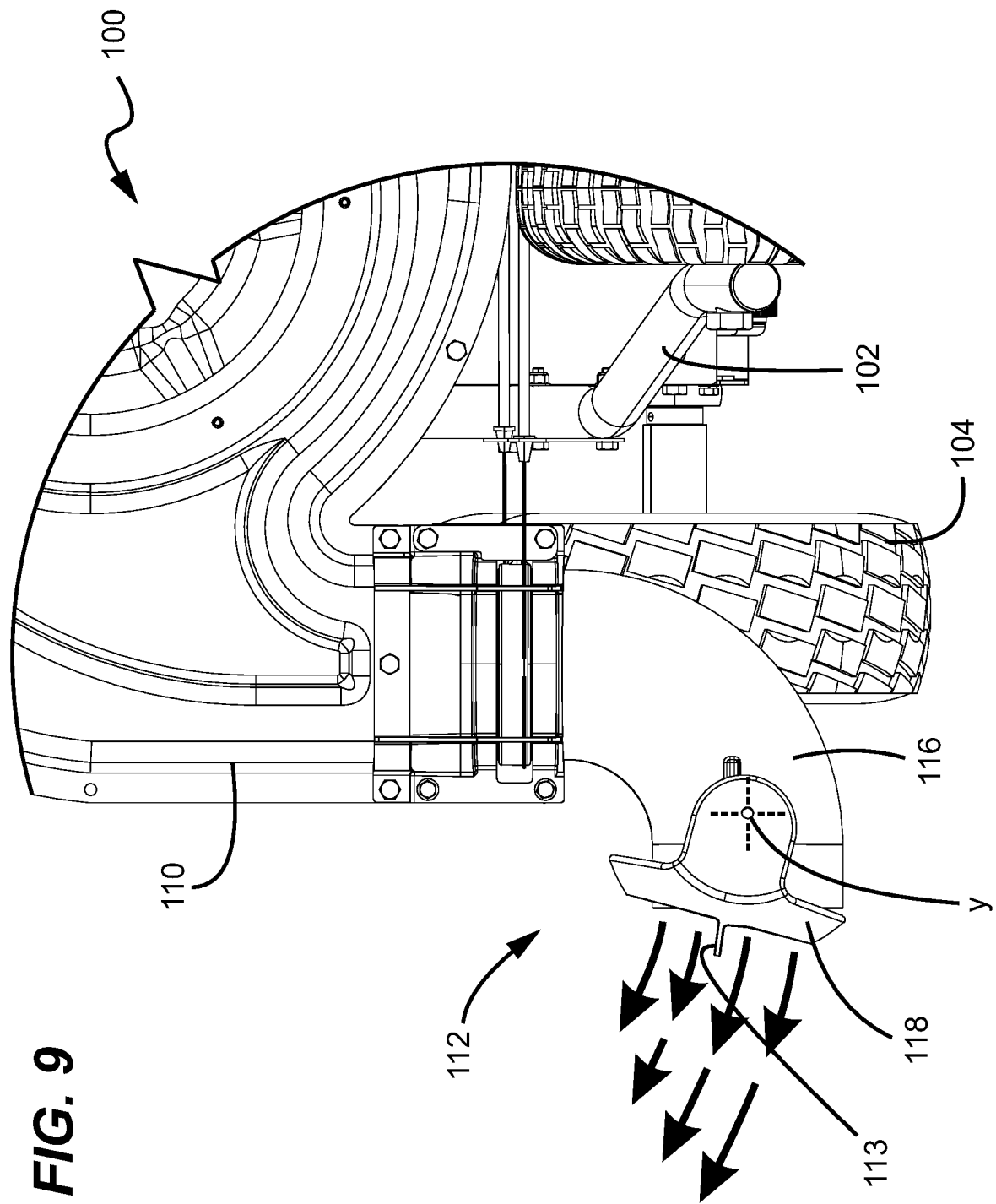
FIG. 9 is a front zoomed-in view of the blower outlet of the blower of FIG. 1 with a vertical flow element of the blower outlet in an upward position.
Figure 10:
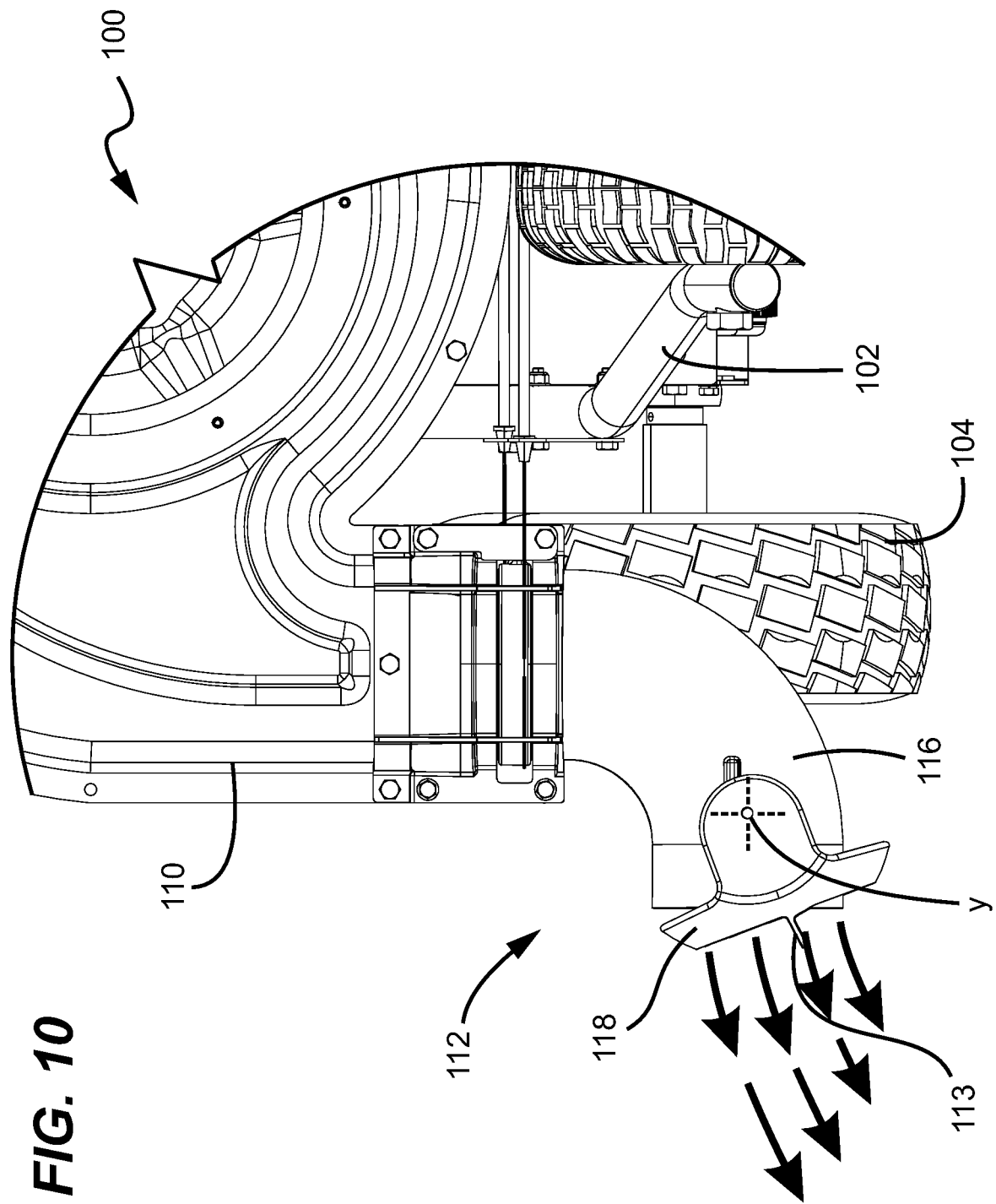
FIG. 10 is another front zoomed-in view of the blower outlet of the blower of FIG. 1 with the vertical flow element of the blower outlet in a downward position.

FIG. 9 shows the vertical flow element 118 positioned in an upward position, directing the air stream upward from the ground. FIG. 10 shows the vertical flow element 118 positioned in a downward position. In some examples, the vertical flow element 118 can have a plurality of preset positions between the upward position and the downward position. In other examples, the horizontal flow element 116 can be infinitely adjusted between the upward position and the downward position by the operator. The vertical flow element 118 rotates about a vertical flow element axis Y. In some examples, the vertical flow element 118 is biased to the neutral position. In some examples, the vertical flow element 118 is biased to the neutral, upward position so that air is output upward and does not immediately affect the ground environment around the blower 100.

Figure 11:
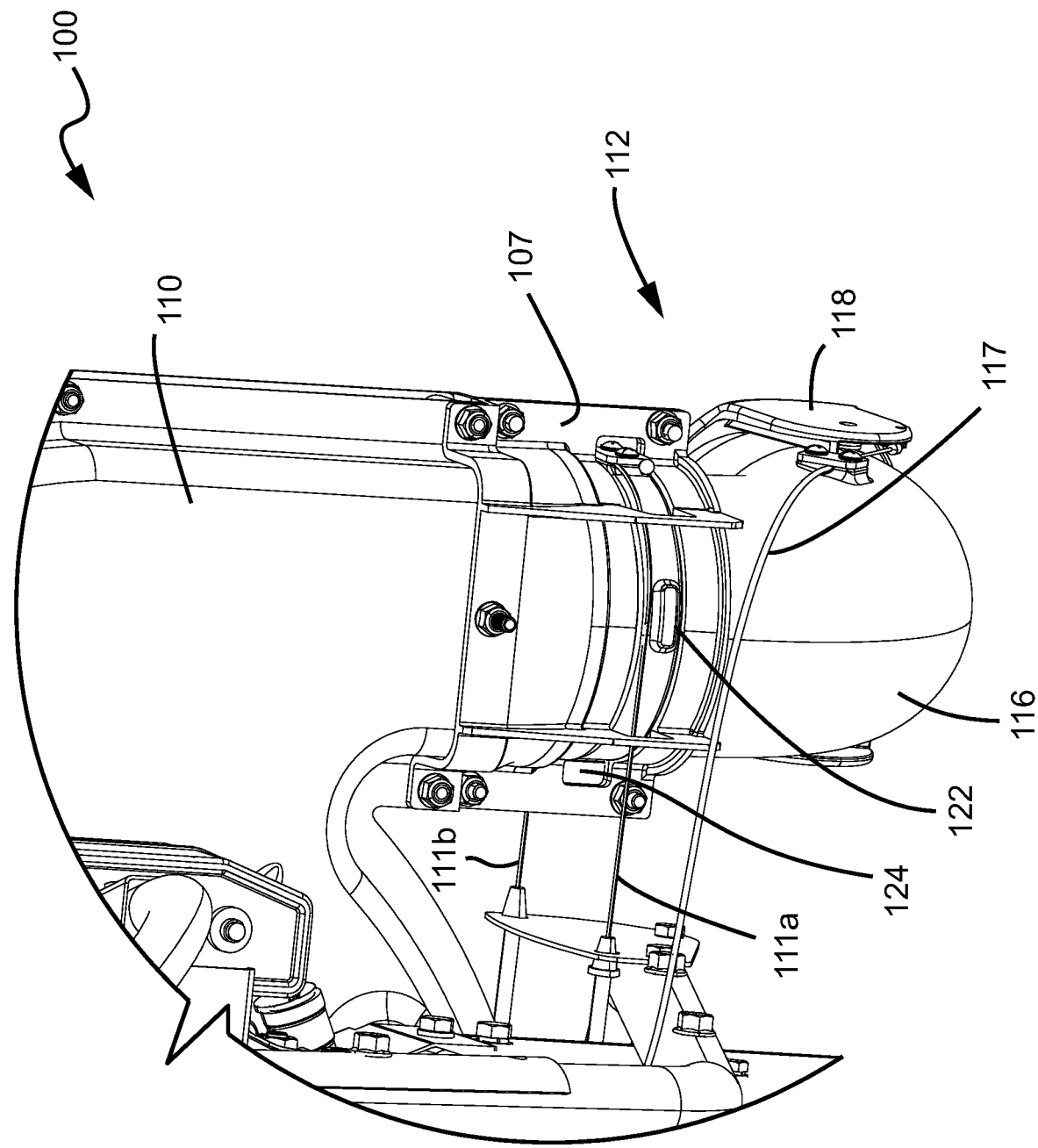
FIG. 11 is a rear perspective zoomed-in view of the horizontal flow element of the blower outlet of the blower of FIG. 1 in a forward facing position.

FIG. 11 shows a rear perspective view of the blower outlet 112. As shown, the horizontal flow element 116 is positioned in a forward position facing the front 101 of the blower 100. In the depicted example, the horizontal flow element 116 includes a stop 122 that interfaces with a stop surface 124 positioned on the outlet housing 107 to limit horizontal rotation of the horizontal flow element 116.

Figure 12:
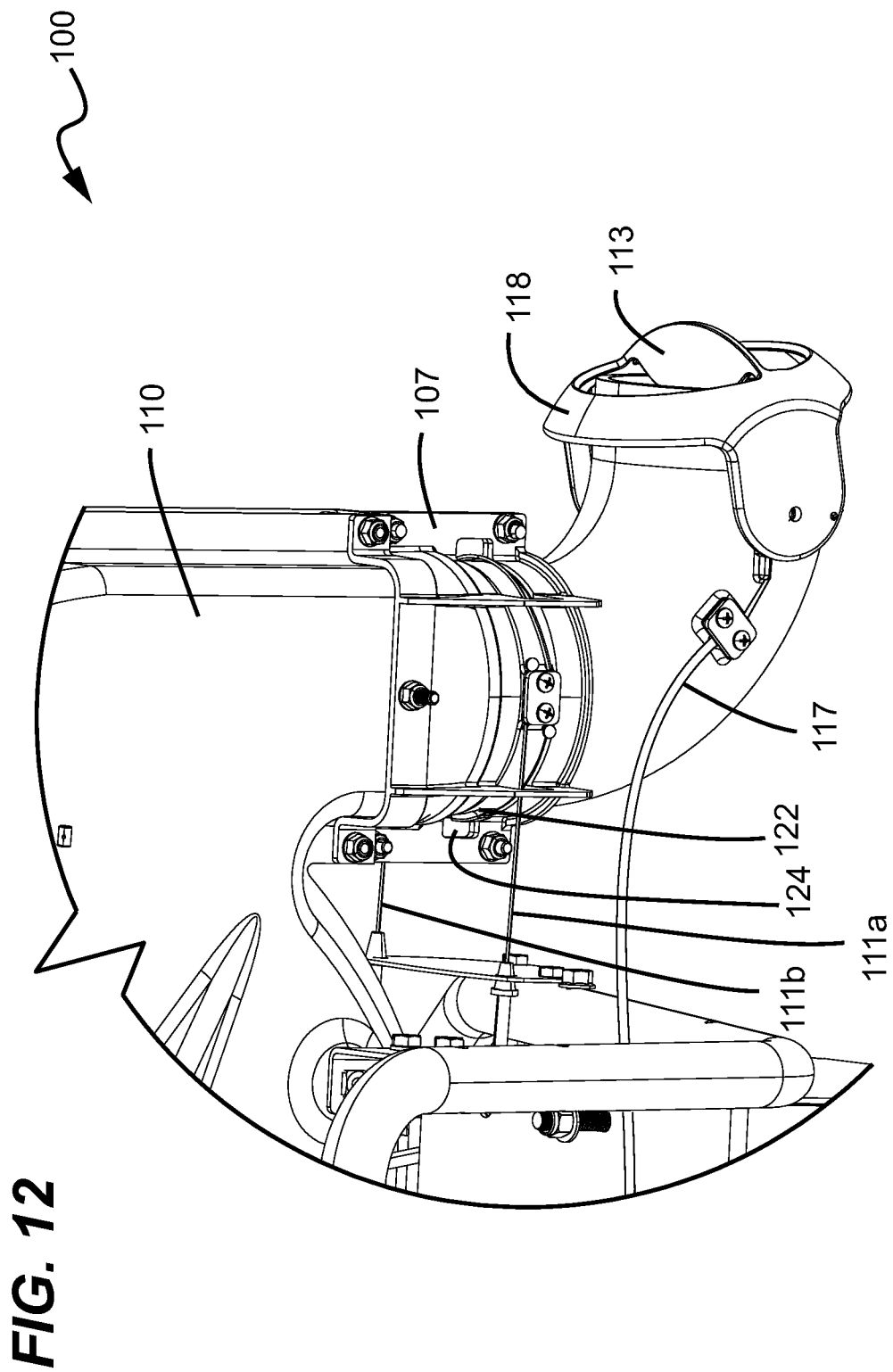
FIG. 12 is another rear perspective zoomed-in view of the horizontal flow element of the blower outlet of the blower of FIG. 1 in a side facing position.

FIG. 12 shows a rear perspective view of the stop 122 interfacing with the stop surface 124, thereby limiting the horizontal rotation of the horizontal flow element 116.

The stop 122 can have a variety of configurations. In the depicted example, the stop 122 is a projection on the horizontal flow element 116. In some examples, the stop 122 can be formed with the horizontal flow element 116. In other examples, the stop 122 can be separately connected to the horizontal flow element 116. In some examples, the stop 122 can be located within a channel or recess of the horizontal flow element 116.

Figure 13:
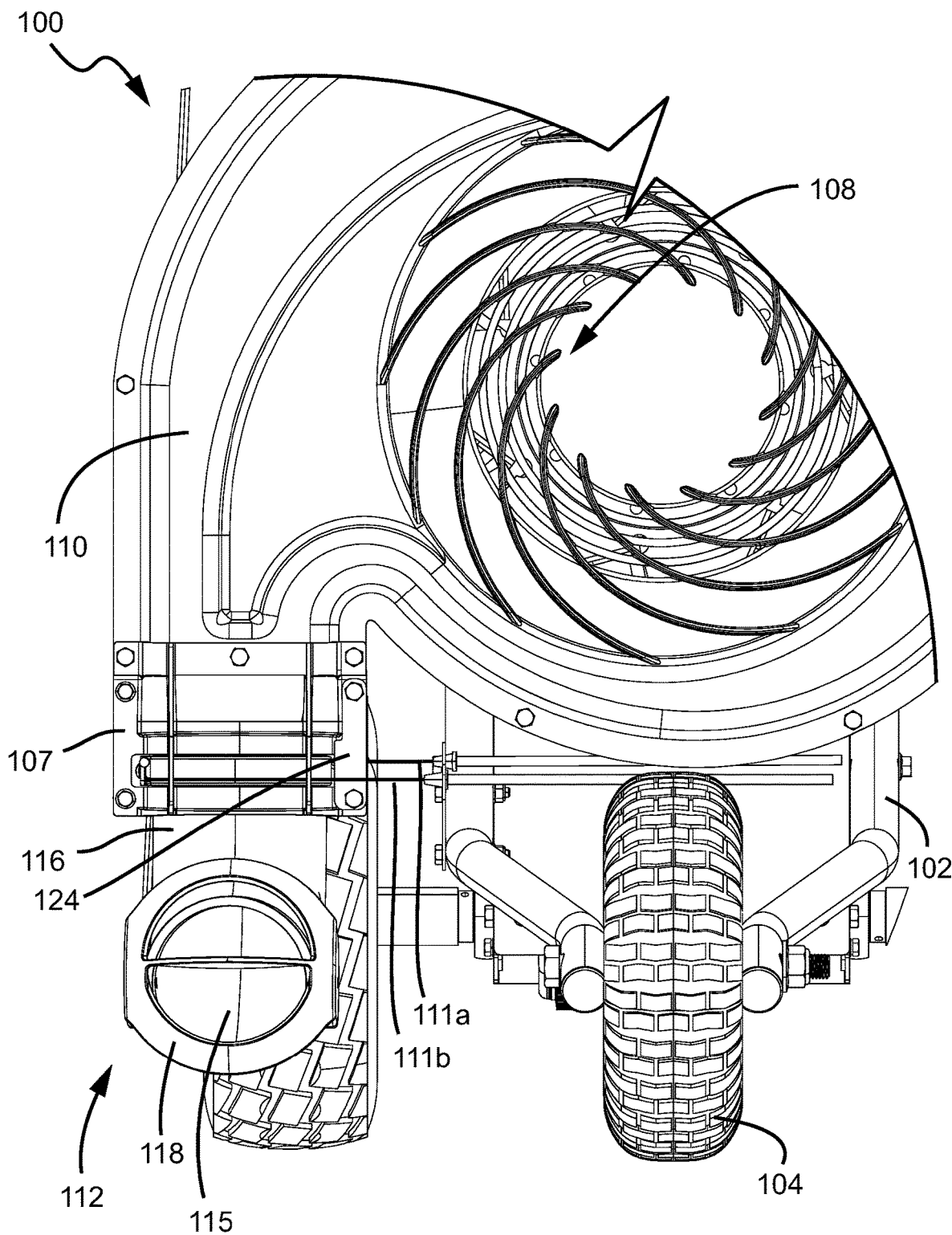
FIG. 13 is another front zoomed-in view of the blower outlet of the blower of FIG. 1.

As shown in the front view of the blower outlet 112 in FIG. 13, the stop surface 124 can have a plate-like construction to ease manufacturing. In some examples, the stop surface 124 is attached to the outlet housing 107.

Figure 14:
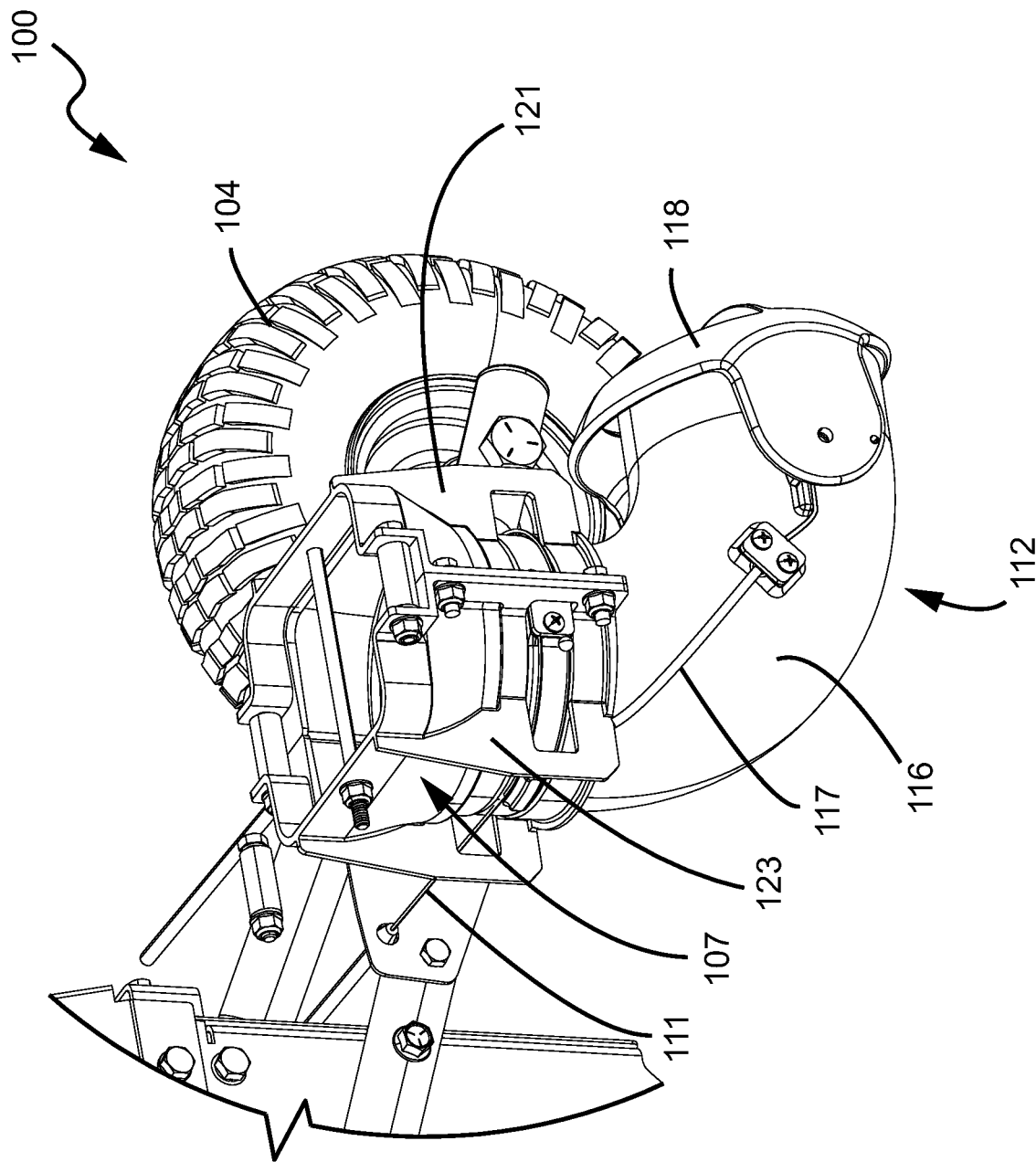
FIG. 14 is a rear perspective zoomed-in view of the blower outlet positioned in an outlet housing of the blower of FIG. 1.

FIG. 14 shows a perspective view of the blower outlet 112 mounted within the outlet housing 107. As shown, the outlet housing 107 has a multi-part design. In the depicted example, the outlet housing 107 includes a first portion 121 and a second portion 123 that are configured to mate together to form the complete outlet housing 107. In some examples, the outlet housing 107 can include more than two portions. In some examples, the outlet housing 107 can be a single portion. In some examples, the outlet housing 107 can be integral with the housing 110 of the fan 108. In some examples, the outlet housing 107 is separate from the housing 110 of the fan 108.

Figure 15:
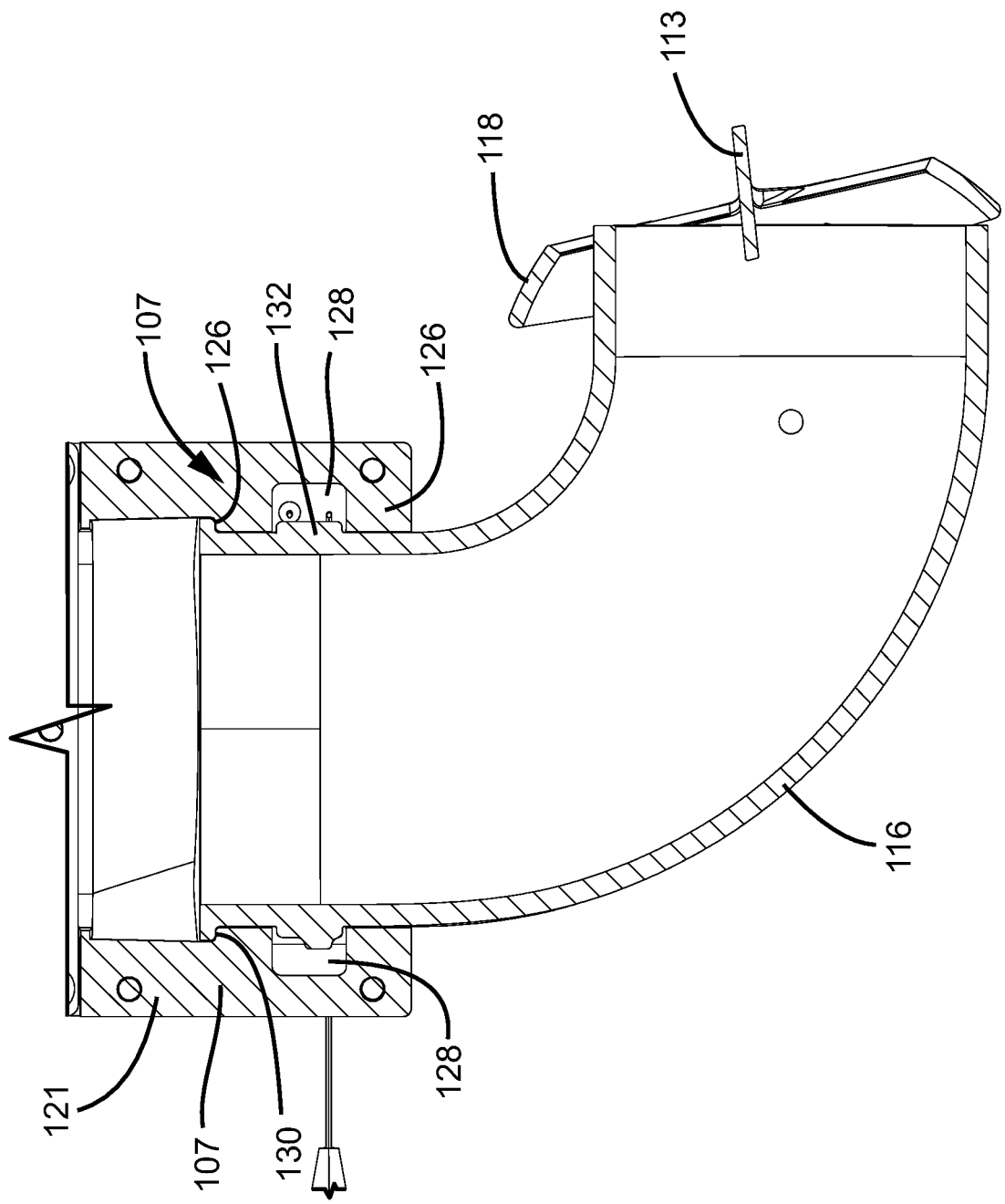
FIG. 15 is a cross-sectional view of the blower outlet positioned in an outlet housing of the blower of FIG. 1.

FIG. 15 shows a cross-sectional view of the blower outlet 112 mounted within the outlet housing 107. As shown, the outlet housing 107 includes an outlet housing bearing flange 126 and recess 128. In some examples, at least one of the outlet housing bearing flange 126 and recess 128 are positioned substantially around the horizontal flow element 116. Only the first portion 121 of the outlet housing 107 is shown in FIG. 15. In some examples, the horizontal flow element 116 is positioned around the outlet housing 107. In some examples, the bearing flange 126 is positioned above and below the recess 128. In some examples, the bearing flange 126 is positioned either or above or below the recess 128.

The horizontal flow element 116 includes a corresponding horizontal flow element flange 130 that is configured to mate with the outlet housing bearing flange 126 so that the horizontal flow element 116 is prevented from being separated from the outlet housing 107. While not removable from, the horizontal flow element 116 is rotatable with respect to the outlet housing 107, specifically the outlet housing bearing flange 126. In some examples, the outlet housing bearing flange 126 acts as a bushing. In some examples, the outlet housing bearing flange 126 can include a bearing positioned between the outlet housing 107 and the horizontal flow element 116. The horizontal flow element 116 also includes a control flange 132 that is accommodated within the recess 128 of the outlet housing 107. In some example, the control flange includes the pair of cables 111a,111b mounted thereto.

Figure 16:
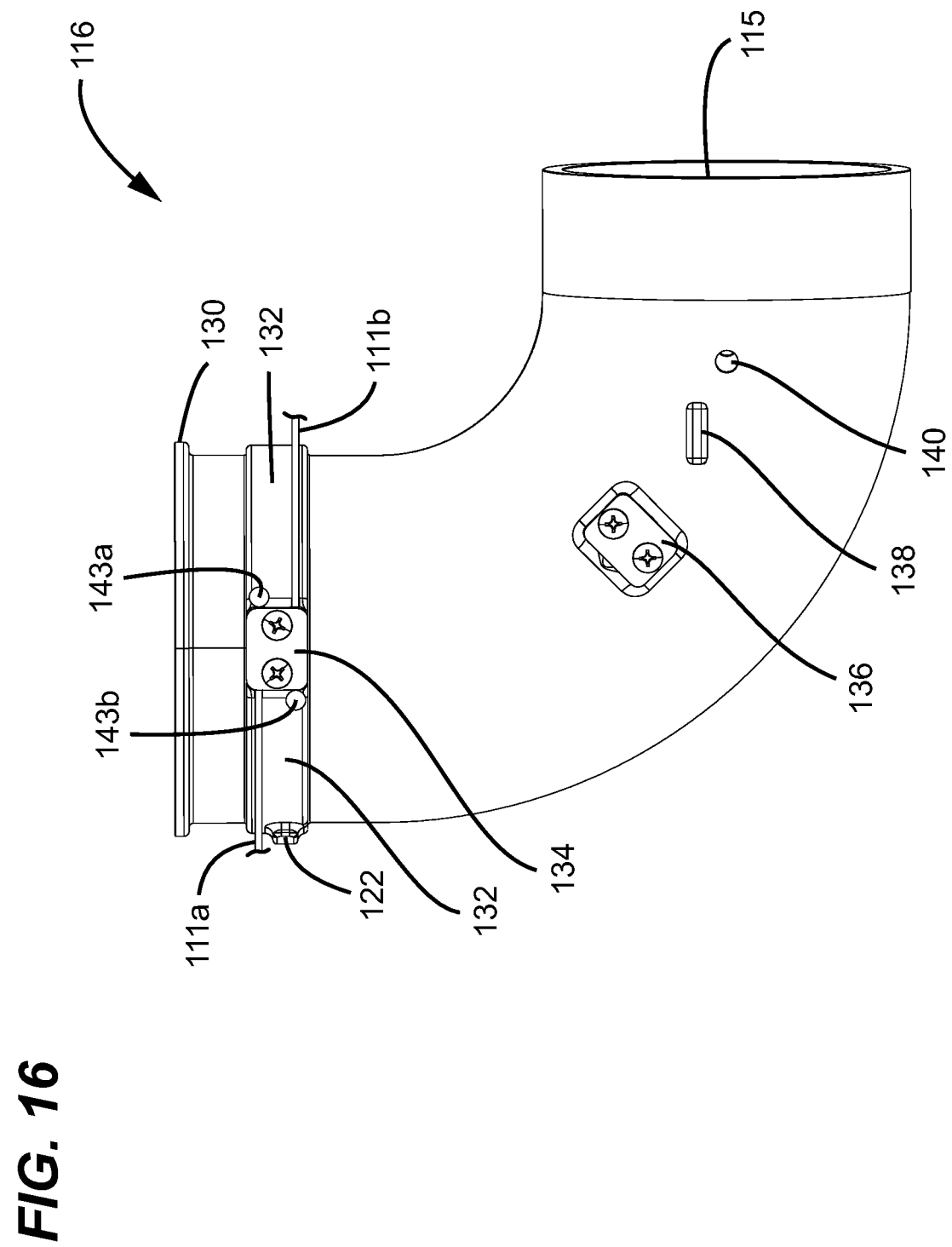
FIG. 16 is a side view of the horizontal flow element of the blower outlet of the blower of FIG. 1.

FIG. 16 shows a side view of the horizontal flow element 116. The horizontal flow element 116 includes the opening 115, the stop 122, the horizontal flow element flange 130, the control flange 132, a horizontal cable mount 134 on the control flange 132, a vertical cable mount 136, a vertical flow element spring post 138, and a vertical flow element attachment aperture 140.

As noted above, rotation of the horizontal flow element 116 is controlled by a pair of cables 111a, 111b. The horizontal cable mount 134 facilitates the mounting of the cables 111a, 111b to the horizontal flow element 116. In some examples, the horizontal cable mount 134 is a clamp. In some examples, the cables 111a, 111b can include stops 143a, 143b at the end of the cables 111a, 111b. The horizontal cable mount 134 clamps the cables 111a, 111b to the control flange 132 behind both the stops 143a, 143b, allowing for the cables 111a, 111b to be secured to the control flange 132. The horizontal cable mount 134 can be configured in a variety of ways without departing from the present disclosure. For example, a single cable can mounted at one positioned on the horizontal flow element 116.

Like the horizontal cable mount 134, the vertical cable mount 136 is configured to secure the cable 117, used to control the position of the vertical flow element 118, to the horizontal flow element 116. In some examples, the vertical cable mount 136 is a clamp.

The vertical flow element spring post 138 and the vertical flow element attachment aperture 140 are both configured to aid in mounting the vertical flow element 118 to the horizontal flow element 116. In some examples, the vertical flow element spring post aids in mounting a torsion spring that controls the bias of the vertical flow element 118 to the horizontal flow element 116. The vertical flow element attachment aperture 140 is configured to receive a fastener used to fasten vertical flow element 118 to the horizontal flow element 116. In some examples, the fastener is a post, a shaft, or the like. In some examples, the vertical flow element attachment aperture 140 defines the vertical flow element axis Y.

FIG. 17 shows a perspective view of the vertical flow element 118 attached to the horizontal flow element 116. FIG. 18 shows a dissembled view of the vertical flow element 118 separated from the horizontal flow element 116. The vertical flow element 118 includes the louver 113, a main body 142, an attachment flange 144, and a spring 146.

As shown, the vertical flow element 118, specifically the main body 142, surrounds the opening 115 of the horizontal flow element 116. In other examples, the vertical flow element 118 does not surround the opening 115. As depicted, the main body 142 has a generally conical shape and aids the louver 113 to direct the air stream exiting the opening 115.

The attachment flange 144 allows the vertical flow element 118 to be secured to the horizontal flow element 116. In some examples, the attachment flange 144 can include fasteners to secure the attachment flange 144 to the vertical flow element attachment aperture 140 of the horizontal flow element 116.

The spring 146 facilitates biasing the vertical flow element 118 to an upward position. The spring 146 is positioned in contact with the vertical flow element spring post 138 and the vertical flow element 118, and around the vertical flow element attachment aperture 140. In some examples, the, the spring 146 biases the vertical flow element 118 in a neutral position In some examples, the vertical flow element 118 is moved by the cable 117 upwardly so that, sans input from the operator, the vertical flow element 118 faces in a upward neutral position. In some examples, the vertical flow element 118 is moved by the cable 117 upwardly so that, sans input from the operator, the vertical flow element 118 faces in a downward neutral position.

Figure 19:
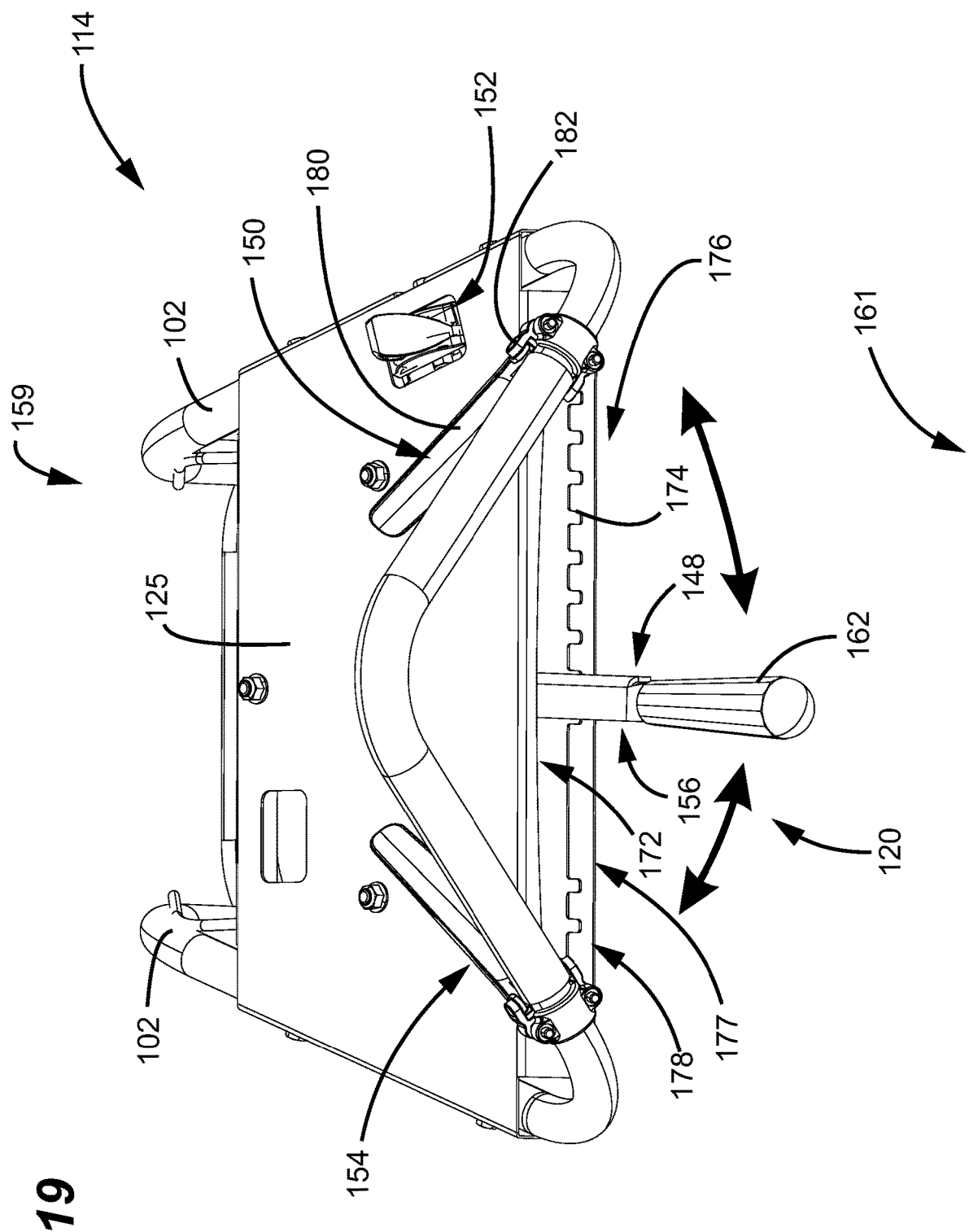
FIG. 19 is a top perspective view of a control station of the blower of FIG. 1.
Figure 20:
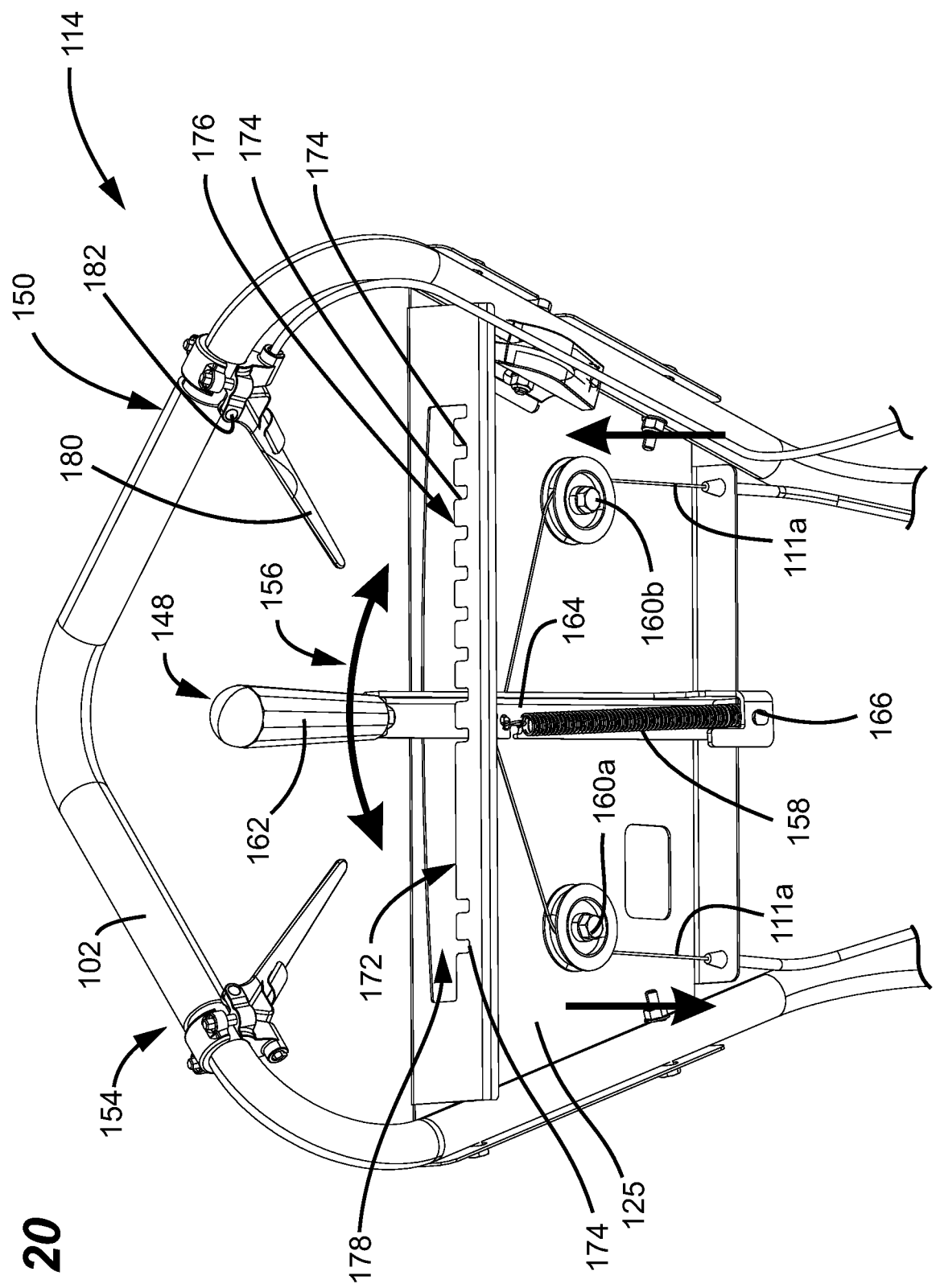
FIG. 20 is a bottom perspective view of the control station of the blower of FIG. 1.
Figure 21:
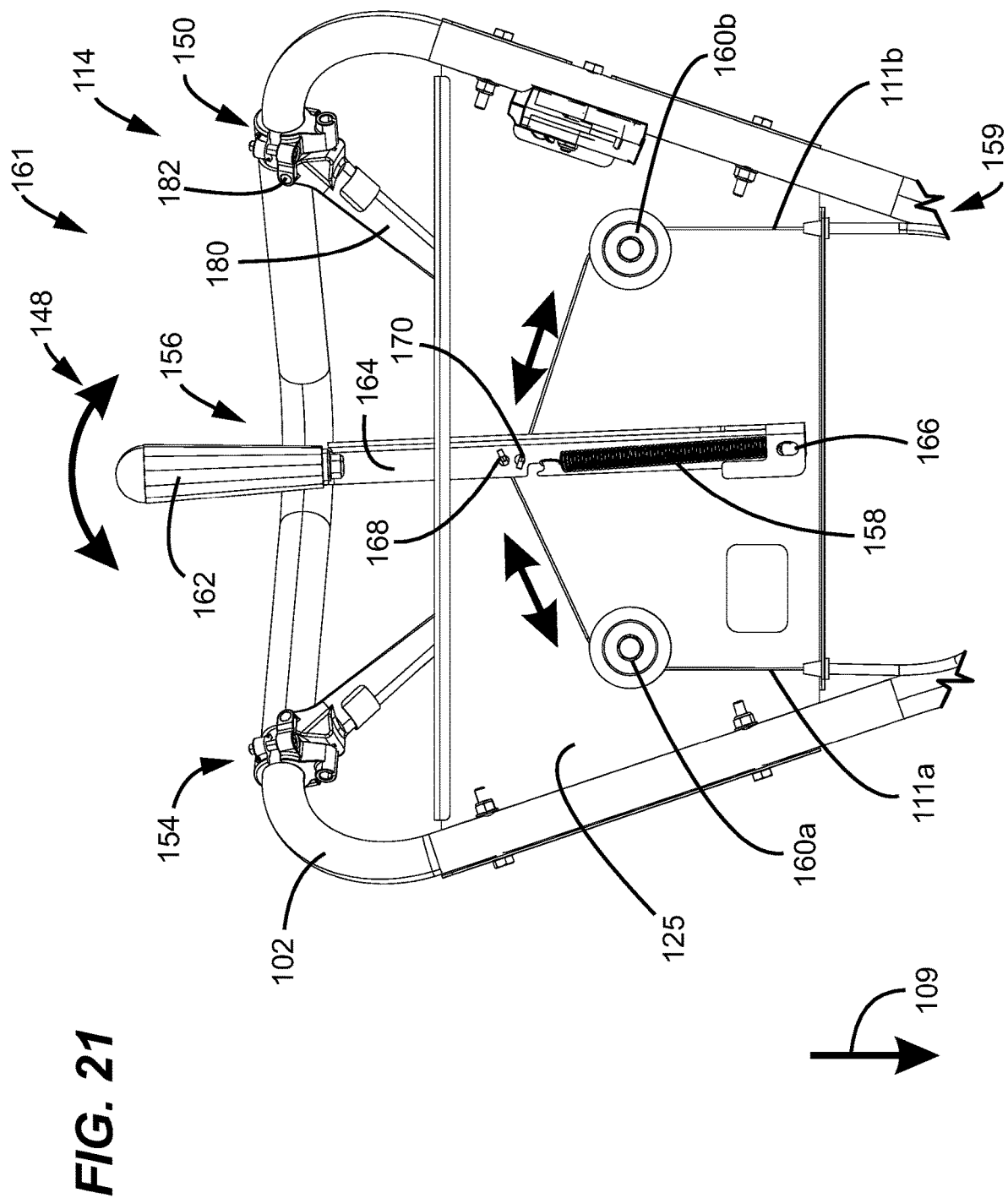
FIG. 21 is a bottom view of the control station of the blower of FIG. 1.

FIG. 19 shows a top perspective view of the control station 114. FIG. 20. shows a bottom perspective view of the control station 114. FIG. 21. shows a bottom view of the control station 114.

The control station 114 include controls 120 and a frame 125 that is attached to the frame 102. In some examples, at least some of the controls 120 are mounted to the frame 125. The controls 120 of the control station 114 include a first control 148 for controlling movement of the horizontal flow element 116, a second control 150 for controlling the movement of the vertical flow element 118, a motor control 152 configured to control the operation of the motor 106, and a self-propel control 154 configured to control a driving speed of the wheels 104. The control station 114 can be configured in a variety of different ways without departing from the present disclosure. The first control 148, the second control 150, the motor control 152 and the self-propel control 154 can be located at a variety of different locations at the control station 114.

It is considered within the scope of the present disclosure that the first control can be configured in a variety of different ways. In the depicted example, the first control 148 includes a lever 156, a lever spring 158, and a pair of cable guides 160a, 160b.

The lever 156 includes a handle 162, a main body 164, a pivot point 166, a first attachment point 168, and a second attachment point 170. The lever 156 can be moved within a recess 172 of the control station frame 125 so that the horizontal flow element 116 is moved with movement of the lever 156. In some examples, the control station frame 125 does include the recess 125.

The recess 172 can have a plurality of notches 174 that are each configured to receive and hold the lever 156. Each notch 174 corresponds with a preset rotational position of the horizontal flow element 116. In some examples, the notches 174 can be organized so that the location of each notch corresponds to the horizontal position of the blower outlet 112. For example, if the lever 156 is positioned in the notches in a left group 176, the blower output 112, specifically the opening 115, faces to left of the blower 100 (shown in FIG. 7). If the lever 156 is positioned in the notches in a right group 178, the blower output 112, specifically the opening 115, faces to right of the blower 100 (shown in FIG. 8). In some examples, there are no notches 174 at a portion 177 of the recess 172 where the blower outlet 112 is orientation facing a wheel 104. In such an example, the operator is informed of the position of the blower outlet 112 based on the position of the lever 156 within the notches 174. This prevents the operator from having visually monitor the position of the blower outlet 112.

In some examples, the notches 174 can be organized in an operational group and a non-operational group. In some examples, when the lever 156 is positioned in a notch of the operational group, the horizontal flow element is positioned in at least one of the first and the second quadrants (see FIG. 4). In some examples, when the lever 156 is positioned in a notch of the non-operational group, the horizontal flow element 116 is positioned in at least one of the third and the fourth quadrants.

The handle 162 is connected to the main body 164 of the lever 156. The handle 162 is configured to be engaged by the operator. The handle 162 is positioned at a back side 161, opposite a front side 159, of the control station 114, within easy reach of where the operator is stationed during operation of the blower 100. The main body 164 of the lever 156 is sized and shaped to interface and hold the lever 156 within a notch 174 of the recess 172.

As the lever 156 is moved, the lever 156 pivots about the pivot point 166, which is also where the lever 156 is pivotally attached the frame 125 of the control station 114. The pivot point 166 also allows the lever 156 to be moved upward and downward within the recess 172 to allow the lever 156 to be repositioned from notch 174 to notch 174.

The first and second attachment points 168, 170 allow the lever 156 to be connected to the cables 111a, 111b that control the movement of the horizontal flow element 116. In some examples, the first and second attachment points 168, 170 are apertures in the main body 164 of the lever 156.

As the lever 156 is moved from side to side within the recess 172, one of the cables 111a, 111b is pulled while the opposite cable 111a, 111b is pushed. Such an arrangement allows for predictable positive movement of the horizontal flow element 116. This allows the operator to know the particular rotational position of the horizontal flow element 116 at all times, without having to visually inspect the horizontal flow element 116. In other examples, a spring and a single cable attached to the horizontal flow element 116 can be utilized to control the movement of the horizontal flow element 116.

The lever spring 158 is configured to bias the lever 156 to a particular position within the recess 172. In some examples, the lever spring 158 biases the lever 156 to be centered within the recess 172 when the lever 156 is not positioned within a notch 174.

The cable guides 160a, 160b guide the cable 111a, 111b to and from the lever 156 to prevent unwanted bending in the cables 111a. 111b. Depending on the routing of the cables 111a, 111b, the first control 148 does not utilize cable guides. In some of the examples, the cable guides 160a, 160b are spools.

The second control 150 includes a lever 180 that is moved to control the movement of the vertical flow element 118. The lever 180 is connected to the frame 102 at the control station 114 and to the cable 117. The lever 180 is pivotable about a pivot point 182 and when the lever 180 is pivoted by the operator, movement of the vertical flow element 118 is facilitated. In some examples, moving the lever 180 closer to the frame 102 causes the vertical flow element 118 to move from the upward position toward the downward position. In some examples, moving the lever 180 closer to the frame 102 causes the vertical flow element 118 to move from the downward position toward the upward position.

The motor control 152, seen in FIG. 19, controls the operation of the motor 106. In some examples, the motor control 152 controls the operational speed of the motor. In some examples still, a position of a throttle of the motor 106 is controlled by the motor control 152. In some examples, the motor control 152 is a movable lever.

The self-propel control 154 controls the driving speed of wheels 104. In some examples, the blower 100 is not self-propelled and therefore does not include a self-propel control. The self-propel control 154 is substantially similar to the second control 150, described above. In some examples, the self-propel control 154 operates a clutch of a self-propel system thereby controlling when the blower 100 is self-propelled.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A blower comprising:
    a motor mounted to a frame, wherein the frame includes wheels mounted to the frame;
    a fan powered by the motor;
    a blower outlet, the fan being configured to expel air from the fan through the blower outlet, the blower outlet being movable in a horizontal direction and a vertical direction;
    a horizontal flow element through which the expelled air flows;
    a vertical flow element through which the expelled air flows after flowing through the horizontal flow element;
    a horizontal control for controlling the horizontal flow element to vary a horizontal position of the blower outlet; and
    a vertical control for controlling the vertical flow element movably attached to the horizontal flow element to vary a vertical position of the blower outlet;
    both the horizontal and vertical controls being positioned remote from the blower outlet.

2. The blower of claim 1, wherein both the horizontal and vertical controls are attached to the frame at a control station, wherein the control station further includes at least one handle to control the movement of the blower.

3. The blower of claim 1, wherein the both the horizontal and vertical controls are connected to the blower outlet by way of cables.

4. The blower of claim 1, wherein the blower outlet is biased to a neutral vertical position.

5. The blower of claim 1, wherein the blower outlet is biased to a neutral horizontal position.

6. The blower of claim 1, wherein the horizontal flow element is movably mounted to the frame.

7. The blower of claim 6, wherein the horizontal flow element includes a stop for limiting the rotation of the horizontal flow element with respect to the frame.

8. The blower of claim 1, wherein the horizontal flow element is a curved tube with an opening and the vertical flow element is a ring that includes one or more louvers.

9. A blower comprising:
    a motor mounted to a frame, wherein the frame includes wheels mounted to the frame;
    a fan powered by the motor;
    a blower outlet, the fan being configured to expel air from the fan through the blower outlet, the blower outlet including:
        a horizontal flow element through which the expelled air flows, the horizontal flow element being movably mounted to the frame; and
        a vertical flow element through which the expelled air flows after flowing through the horizontal flow element, the vertical flow element being movably attached to the horizontal flow element, at least one of the horizontal and vertical flow elements being spring biased to a neutral position; and a control station attached to the frame, wherein the control station includes:

a horizontal control for controlling movement of the horizontal flow element of the blower outlet; and a vertical control for controlling movement of the vertical flow element of the blower outlet.

10. The blower of claim 9, wherein the vertical flow element is biased to a neutral position.

11. The blower of claim 9, wherein the control station includes a motor control configured to control a position of a throttle of the motor.

12. The blower of claim 9, wherein the horizontal control is movable between preset positions.

13. The blower of claim 12, wherein the horizontal control includes at least three preset positions.

14. The blower of claim 9, wherein the horizontal control includes a first actuation mechanism and a second actuation mechanism, wherein both the first actuation mechanism and the second actuation mechanism are connected to the horizontal flow element.

15. The blower of claim 14, wherein the first and second actuation mechanisms are cables, wherein, when the horizontal control is moved in a first control direction, the first actuation mechanism moves the horizontal flow element in a first flow direction, and wherein, when the horizontal control is moved in a second control direction, the second actuation mechanism moves the horizontal flow element in a second flow direction.

16. The blower of claim 9, wherein the horizontal flow element is a curved tube with an opening and the vertical flow element is a ring that includes one or more louvers.

17. A blower comprising:
a motor mounted to a frame, wherein the frame includes wheels mounted to the frame;
a fan powered by the motor;
a blower outlet configured to direct air from the fan; and
a control station attached to the frame, wherein the control station further includes:
a first control for controlling movement of a first element of the blower outlet in a first direction, wherein air is directed through the first element;
a second control for controlling movement of a second element of the blower outlet in a second direction, the second element being movably attached to the first element, wherein air is directed through the second element after flowing through the first element; and
at least one of the group comprising:
a motor control configured to control the motor; and
a self-propel control configured to control a driving speed of the wheels.

18. The blower of claim 17, wherein the first control controls a horizontal position of the blower outlet, and the second control controls a vertical position of the blower outlet.

19. The blower of claim 17, wherein the first control is movable between preset positions.

20. The blower of claim 19, wherein the first control includes at least three preset positions.

21. The blower of claim 17, wherein the first control includes a first actuation mechanism and a second actuation mechanism, wherein both the first actuation mechanism and the second actuation mechanism are connected to the blower outlet.

22. The blower of claim 17, wherein the first element is a curved tube with an opening and the second element is a ring that includes one or more louvers.

* * * * *